United States Patent
Kuroda

(10) Patent No.: US 8,042,008 B2
(45) Date of Patent: Oct. 18, 2011

(54) INFORMATION PROCESSING DEVICE, TRANSFER CIRCUIT AND ERROR CONTROLLING METHOD FOR INFORMATION PROCESSING DEVICE

(75) Inventor: Yasuhiro Kuroda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/926,530

(22) Filed: Nov. 23, 2010

(65) Prior Publication Data
US 2011/0072298 A1  Mar. 24, 2011

Related U.S. Application Data

(63) Continuation of application No. PCT/JP2008/060069, filed on May 30, 2008.

(51) Int. Cl.
*G06F 11/00* (2006.01)
(52) U.S. Cl. .............................. 714/48; 714/27; 710/104
(58) Field of Classification Search .................... 714/10, 714/11, 27, 30, 48; 709/220, 221; 710/104, 710/316, 317; 713/100
See application file for complete search history.

(56) References Cited

U.S. PATENT DOCUMENTS

| | | | | |
|---|---|---|---|---|
| 5,808,886 | A * | 9/1998 | Suzuki | 714/30 |
| 6,725,317 | B1 * | 4/2004 | Bouchier et al. | 714/10 |
| 7,225,363 | B2 * | 5/2007 | Drogichen et al. | 714/39 |
| 7,356,678 | B2 * | 4/2008 | Shaw et al. | 709/220 |
| 7,370,239 | B2 * | 5/2008 | Apel et al. | 714/43 |
| 7,392,445 | B2 * | 6/2008 | Borkenhagen et al. | 714/48 |
| 7,827,442 | B2 * | 11/2010 | Sharma et al. | 714/10 |
| 2004/0153888 | A1 | 8/2004 | Kadoi | |
| 2005/0166089 | A1 | 7/2005 | Ito et al. | |
| 2006/0212763 | A1 * | 9/2006 | Takahashi | 714/48 |
| 2008/0313362 | A1 * | 12/2008 | Takamoto | 710/19 |
| 2009/0307535 | A1 * | 12/2009 | Hataida | 714/48 |

FOREIGN PATENT DOCUMENTS

| | | |
|---|---|---|
| JP | 7-152697 | 6/1995 |
| JP | 2003-162430 | 6/2003 |
| JP | 2004-62535 | 2/2004 |
| JP | 2005-190038 | 7/2005 |
| JP | 2006-190029 | 7/2006 |

OTHER PUBLICATIONS

International Search Report for PCT/JP2008/060069, mailed Aug. 12, 2008.

* cited by examiner

Primary Examiner — Robert Beausoliel, Jr.
Assistant Examiner — Joseph D Manoskey
(74) Attorney, Agent, or Firm — Staas & Halsey LLP

(57) ABSTRACT

An information processing device includes SBs; an XBB for executing data transfer between the SBs; and an SCF for managing and controlling the SBs and the XBB. The SB includes a transmitting/receiving unit for transmitting a notification packet indicating occurrence of an error via the XBB when detecting the occurrence of the error. The SCF includes an executing unit for executing a configuration change process corresponding to an instruction when detecting the instruction related to the SB, a suspending unit for suspending acceptance of an error report from the SB in which the error occurs during execution of the configuration change process and an XBB controller for controlling the XBB to destroy the notification packet received from the SB of which configuration change process is being executed and controlling the XBB to inhibit transfer of the notification packet to the SB of which configuration change process is being executed.

16 Claims, 17 Drawing Sheets

FIG.5

| bit0 | 8 | 12 | 16 | 23 | 31 |
|------|---|----|----|----|----|
| OPCD | SID | TID | PLNG | PID | |
| RTCD | RSID | | | RPID | |
| data0 ||||||
| data1 ||||||
| ⋮ ||||||

FIG.6

| bit0 | 8 | 12 | 16 | 23 | 31 |
|------|---|----|----|----|----|
| OPCD | SID | | PLNG | PID | |
| adrs0 ||||||
| adrs1 ||||||

FIG.7

| bit0 | 8 | 12 | 16 | 23 | 31 |
|---|---|---|---|---|---|
| OPCD | SID | | PLNG | PID | |
| RTCD | RSID | | | RPID | |

FIG.8

| bit0 | 8 | 12 | 16 | 20 | 24 | 31 |
|---|---|---|---|---|---|---|
| OPCD | SID | ERLV | PTID | EUTY | EUID | |

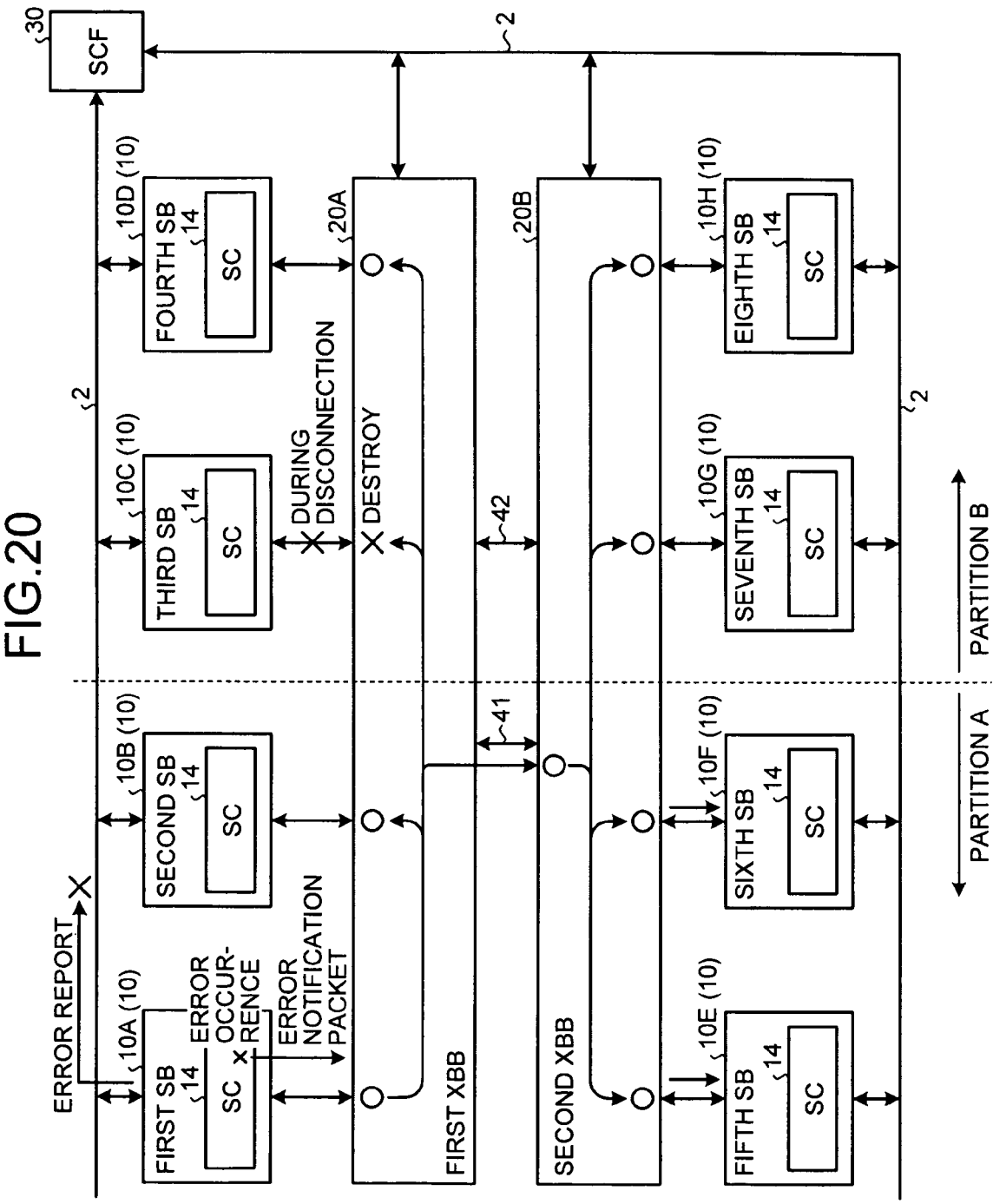

INFORMATION PROCESSING DEVICE, TRANSFER CIRCUIT AND ERROR CONTROLLING METHOD FOR INFORMATION PROCESSING DEVICE

CROSS-REFERENCE TO RELATED APPLICATION

This application is a continuation of International Application No. PCT/JP2008/060069, filed on May 30, 2008, the entire contents of which are incorporated herein by reference.

FIELD

The embodiments discussed herein are directed to an information processing device, a transfer circuit, and an error controlling method for information processing error controlling method for information processing device.

BACKGROUND

Conventionally, as the information processing device, technology having a plurality of system boards (hereinafter, simply referred to as SB), a cross bar board (hereinafter, simply referred to as XBB) connected to the plurality of SBs for executing the data transfer between the plurality of SBs and a system control facility (hereinafter, simply referred to as SCF) for managing and controlling the plurality of SBs and XBB to execute the computer processing by the plurality of SBs is known.

The SBs has a plurality of central processing units (CPUs), an input/output controller for controlling data input/output, a memory for storing a variety pieces of information, a system controller (hereinafter, simply referred to as SC) for monitoring and controlling an entire SB, an XBB interface responsible for interface with the XBB and the like.

As the conventional information processing device, technology to destroy overlapping notification of the same error when the same error occurs in a plurality of devices and a management device is notified of occurrence of the error in the management device for managing the plurality of devices, and technology not to notify the device in which the error occurs of the error when the management device for managing the plurality of devices notifies each device of the error notification are known.

As the conventional information processing device, technology having a plurality of computers and a computer network loosely coupling the plurality of computers to disconnect a computer in which failure occurs from the computer network when the failure occurs in any of the plurality of computers is known.

Patent Document 1: Japanese Laid-open Patent Publication No. 2003-162430
Patent Document 2: Japanese Laid-open Patent Publication No. 2006-190029
Patent Document 3: Japanese Laid-open Patent Publication No. 07-152697

In the above-described conventional information processing device, when the error occurs in any of the plurality of control circuits such the SBs connected to the transfer circuit such as the XBB, for example, the control circuit in which the error occurs notifies the management control circuit of the error report, and by this, the management control circuit may recognize the control circuit in which the error occurs based on the error report.

In the above-described conventional information processing device, when change in operational configuration to disconnect the control circuit from the transfer circuit, that is to say, a configuration change instruction is detected, a configuration change may be realized by executing a configuration change process to stop accessing the control circuit to be disconnected from the transfer circuit, hold cache contents in the control circuit, and thereafter disconnect the control circuit from the transfer circuit.

However, in the above-described conventional information processing device, when the error occurs in the control circuit of which configuration change process is being executed, for example, although the control circuit in which the error occurs is recognized based on the error report in the management control circuit, after the completion of the configuration change process, the control circuit in which the error occurs is disconnected from the transfer circuit. As a result, in the above-described conventional information processing device, when the error occurs in the control circuit of which configuration change process is being executed, since a system configuration during the execution of the configuration change process and the system configuration after the completion of the configuration change process are different from each other, there might be a case in which the stable error detection control cannot be secured due to difference in the system configuration.

SUMMARY

According to an aspect of an embodiment of the invention, an information processing device includes a plurality of control circuits; a transfer circuit that executes data transfer between the plurality of control circuits; and a management control circuit that controls the plurality of control circuits and the transfer circuit. The control circuits and the transfer circuit include an error reporting unit that notifies the management control circuit of an error report when detecting occurrence of an error; and an error transmitting unit that transmits error notification data when detecting the occurrence of the error. The transfer circuit includes a transfer controller that transfers received error notification data to a circuit other than a circuit that has transmitted the error notification data out of the control circuits and the transfer circuit when receiving the error notification data. The management control circuit includes a restoration process executing unit that executes a restoration process for the error occurrence site based on the error report when receiving the error report; a configuration change process executing unit that executes a configuration change process corresponding to a configuration change instruction when detecting the configuration change instruction related to the control circuits; a report acceptance suspending unit that suspends acceptance of the error report during execution of the configuration change process by the configuration change process executing unit; and a transfer circuit controller that controls the transfer circuit to destroy the error notification data received from a control circuit of which configuration change process is being executed by the configuration change process executing unit and controls the transfer circuit to inhibit transfer of the error notification data to the control circuit of which configuration change process is being executed.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is an illustrative diagram illustrating the format configuration of the PP packet (response packet);

FIG. 6 is an illustrative diagram of the format configuration of a BC packet (request packet);

FIG. 7 is an illustrative diagram of the format configuration of the BC packet (response packet);

FIG. 8 is an illustrative diagram illustrating the format configuration of an error notification packet;

FIG. 20 is an illustrative diagram illustrating the operation of the information processing device related to a case in which the error of level 3 occurs in the first SB in the different partition during the execution of the configuration change process of a third SB, for example, during the disconnection.

DESCRIPTION OF EMBODIMENT(S)

Preferred embodiments of the present invention will be explained with reference to accompanying drawings.

Figure 1:
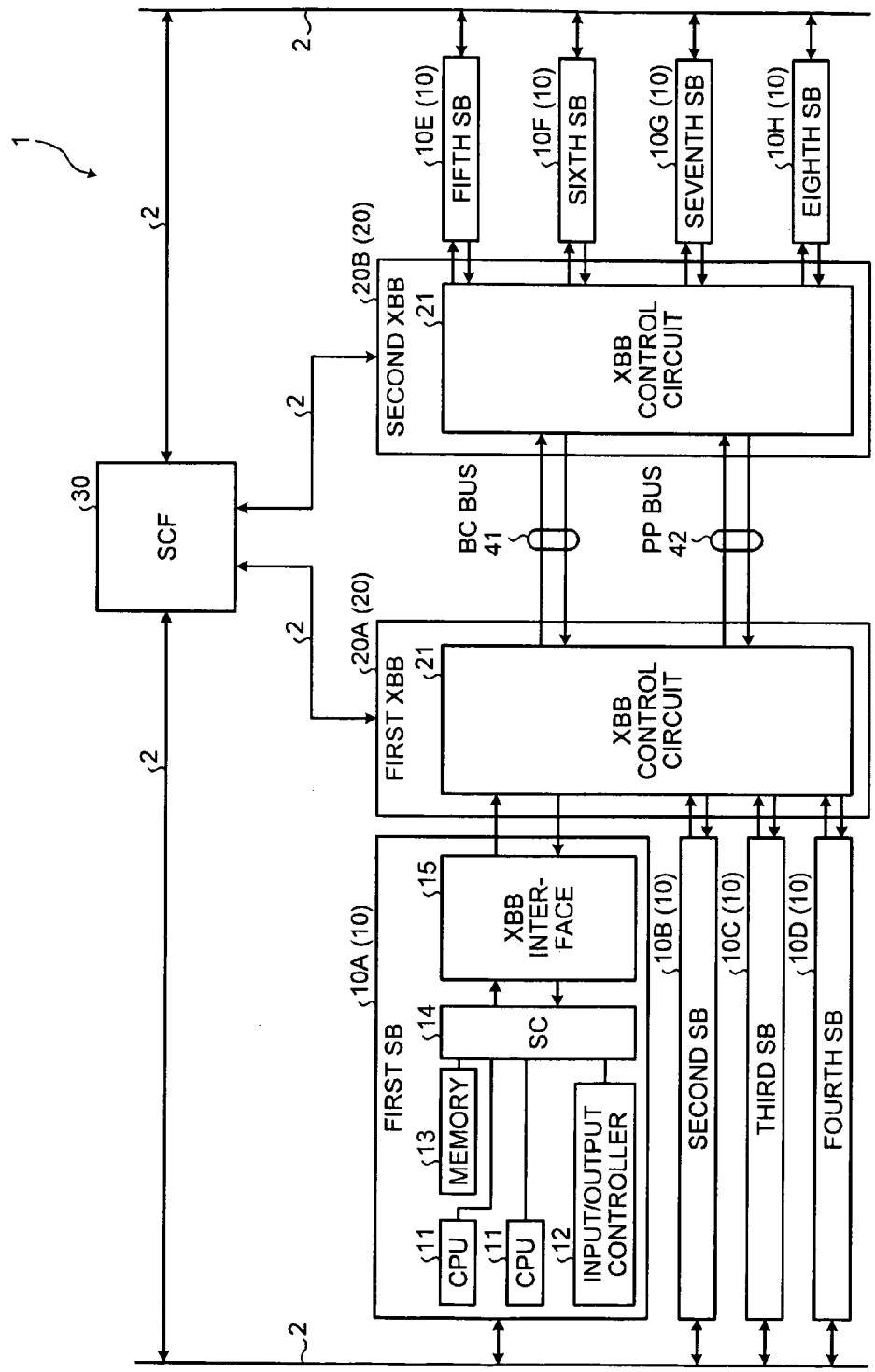
FIG. 1 is a block diagram illustrating a schematic configuration in an information processing device illustrating this embodiment.

FIG. 1 is a block diagram illustrating a schematic configuration in the information processing device illustrating this embodiment.

An information processing device 1 illustrated in FIG. 1 has a plurality of SBs 10, a plurality of XBBs 20 connected to the plurality of SBs 10 for executing packet transfer between the plurality of SBs 10 and an SCF 30 for managing and controlling the plurality of SBs 10 and the plurality of XBBs 20.

The SB 10 has, for example, two CPUs 11, an input/output controller 12 for controlling data input/output, a memory 13 for storing a variety of pieces of information, an SC 14 for monitoring and controlling an entire SB 10 and an XBB interface 15 responsible for communication interface with the XBB 20.

The information processing device 1 incorporates a total of eight SBs 10, which are a first SB 10A, a second SB 10B, a third SB 10C, a fourth SB 10D, a fifth SB 10E, a sixth SB 10F, a seventh SB 10G and an eighth SB 10H, for example.

The XBB 20 incorporates an XBB control circuit 21 for executing the packet transfer between the SBs 10, and the XBB control circuit 21 transmits and receives a packet to and from the SC 14 in the SB 10.

The information processing device 1 incorporates a total of two XBBs, which are a first XBB 20A and a second XBB 20B, for example.

The first XBB 20A is connected to the first SB 10A, the second SB 10B, the third SB 10C and the fourth SB 10D and is connected to the second XBB 20B for realizing the packet transfer between the first SB 10A, the second SB 10B, the third SB 10C and the fourth SB 10D, and the second XBB 20B.

The second XBB 20B is connected to the fifth SB 10E, the sixth SB 10F, the seventh SB 10G and the eighth SB 10H and is connected to the first XBB 20A for realizing the packet transfer between the fifth SB 10E, the sixth SB 10F, the seventh SB 10G and the eighth SB 10H, and the first XBB 20A.

When the first XBB 20A and the second XBB 20B receive the packet from the SB 10, they transfer the received packet to the SB 10 or the XBB 20 based on a target ID in a header of the packet.

A BC bus 41 for simultaneously transmitting the packet from an optional SB 10 out of the plurality of SBs 10 to all the SBs 10 other than the optional SB 10 by broadcast (hereinafter, simply referred to as BC) and a PP bus 42 for individually transmitting the packet between the SBs 10 by one-to-one point-to-point (hereinafter, simply referred to as PP) are arranged between the first XBB 20A and the second XBB 20B.

Figure 15:
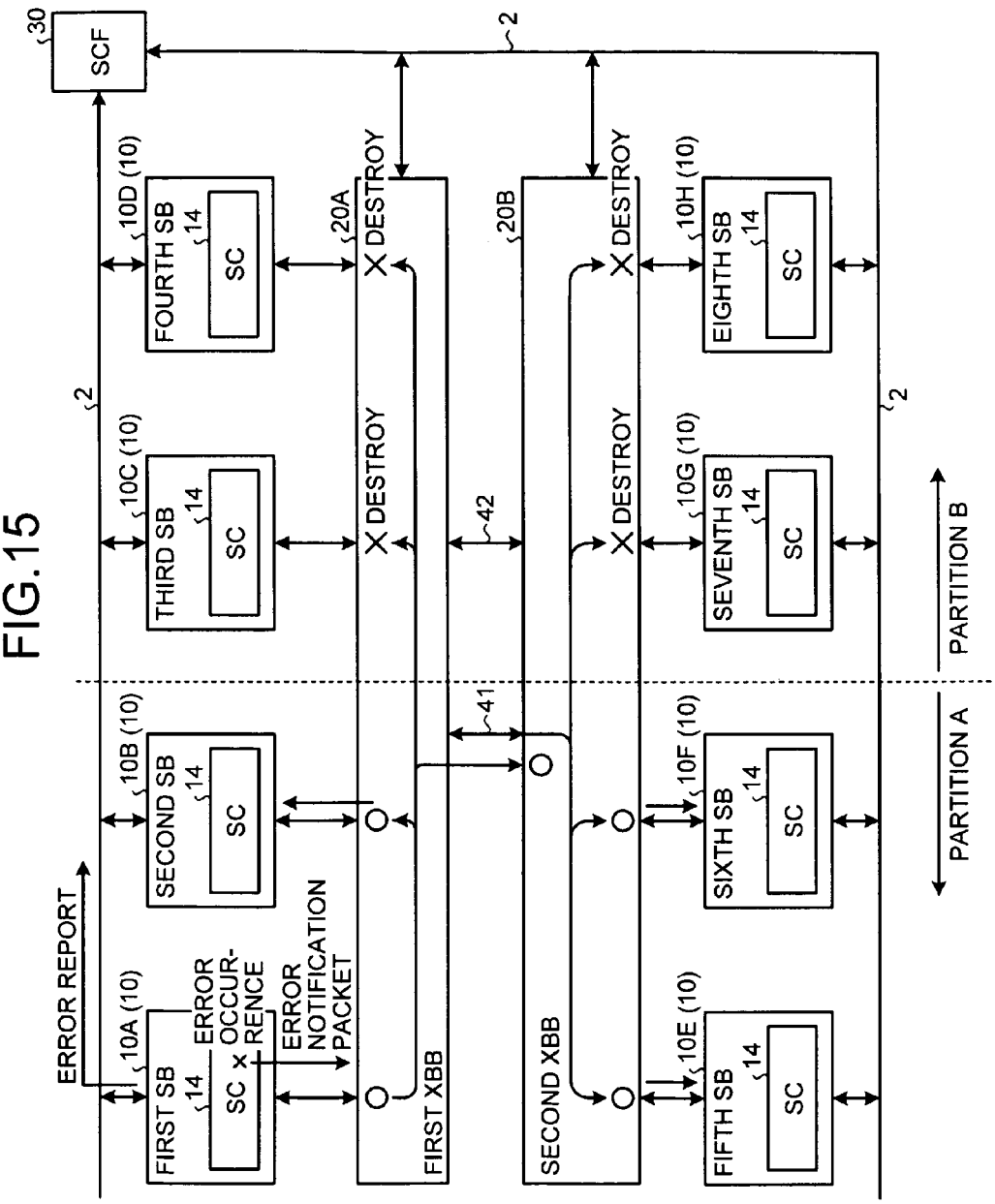
FIG. 15 is an illustrative diagram illustrating operation in the information processing device when an error of level 2 occurs in a first SB.

The eight SBs 10 are divided into two partitions A and B, for example, and the first SB 10A, the second SB 10B, the fifth SB 10E and the sixth SB 10F are managed in one partition A, and the third SB 10C, the fourth SB 10D, the seventh SB 10G and the eighth SB 10H are managed in the other partition B (refer to FIG. 15).

The SCF 30 manages and controls each SB 10 and each XBB 20 through a control line 2.

Figure 2:
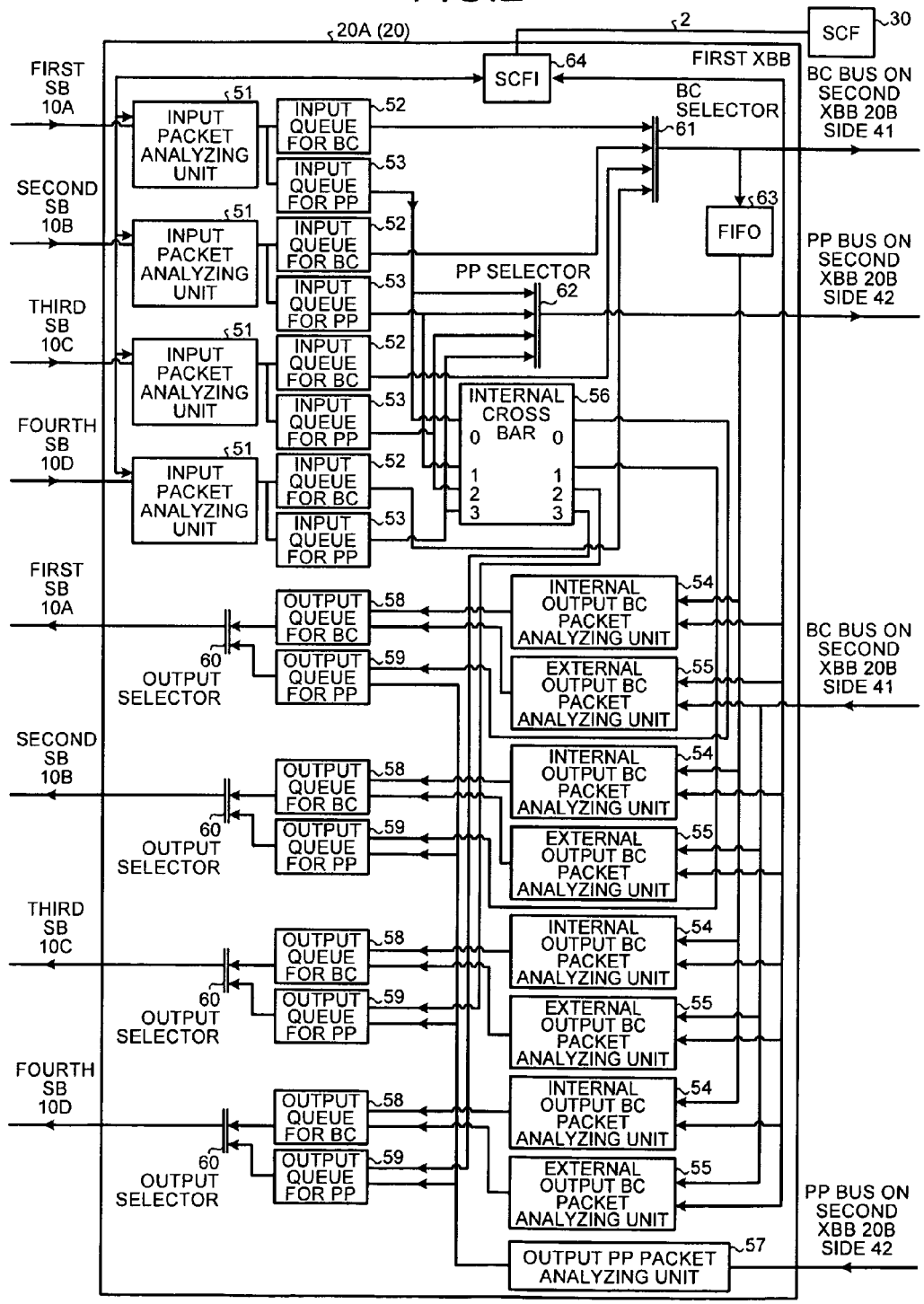
FIG. 2 is a block diagram illustrating a schematic configuration in a first XBB.

FIG. 2 is a block diagram illustrating a schematic configuration in the first XBB 20A. Meanwhile, although the schematic configuration in the first XBB 20A for accommodating and connecting the first SB 10A, the second SB 10B, the third SB 10C and the fourth SB 10D is illustrated in FIG. 2, since the second XBB 20B for accommodating and connecting the fifth SB 10E, the sixth SB 10F, the seventh SB 10G and the eighth SB 10H has a substantially same configuration, overlapping description of the configuration and operation is not repeated by assigning the same reference numerals.

The first XBB 20A illustrated in FIG. 2 has an input packet analyzing unit 51 for analyzing an input packet from the connected SB 10, an input queue for BC 52 for accepting and setting a BC packet as the input packet based on a result of analysis of the input packet analyzing unit 51, and an input queue for PP 53 for accepting and a PP packet as the input packet based on the result of analysis of the input packet analyzing unit 51 for each SB 10 (the first SB 10A, the second SB 10B, the third SB 10C and the fourth SB 10D) accommodated in and connected to its own device.

When receiving the input packet from the connected SB 10, the input packet analyzing unit 51 analyzes an operation code (hereinafter, simply referred to as OPCD) of the input packet and sets the input packet in the input queue for BC 52 as the BC packet when a packet type is the BC packet based on the result of analysis.

When receiving the input packet from the connected SB 10, the input packet analyzing unit 51 analyzes the OPCD of the input packet and sets the input packet in the input queue for PP 53 as the PP packet when the packet type is the PP packet.

Meanwhile, in the first XBB 20A, the input packet analyzing unit 51, the input queue for BC 52 and the input queue for PP 53 are arranged for each SB 10 (the first SB 10A, the second SB 10B, the third SB 10C and the fourth SB 10D) accommodated in and connected to the same.

The first XBB 20A has an internal output BC packet analyzing unit 54 for analyzing the BC packet from the SB 10 accommodated in and connected to the same when receiving the BC packet from the connected SB 10 via the input queue for BC 52, a BC selector 61 and a FIFO 63 to be described later, and an external output BC packet analyzing unit 55 for analyzing the BC packet from the SB 10 accommodated in and connected to the second XBB 20B when receiving the BC packet from the second XBB 20B via the BC bus 41.

Meanwhile, in the first XBB 20A, the internal output BC packet analyzing unit 54 and the external output BC packet analyzing unit 55 is necessary to be arranged for each SB 10 (the first SB 10A, the second SB 10B, the third SB 10C and the fourth SB 10D) accommodated in and connected to the same.

The first XBB 20A has an internal cross bar 56 for transferring the PP packet from the input queue for PP 53 arranged for each SB 10 accommodated in and connected to the same to the SB 10 accommodated in and connected to the same, and an output PP packet analyzing unit 57 for analyzing the PP packet when receiving the PP packet from the SB 10 accommodated in and connected to the second XBB 20B via the PP bus 42.

The first XBB 20A has an output queue for BC 58 for accepting and setting the BC packet from the internal output BC packet analyzing unit 54 or the external output BC packet analyzing unit 55 as an output packet to the connected SB 10 and an output queue for PP 59 for accepting and setting the PP packet from the internal cross bar 56 or the output PP packet analyzing unit 57 as the output packet to the connected SB 10.

Meanwhile, in the first XBB 20A, the output queue for BC 58 and the output queue for PP 59 is necessary to be arranged for each SB 10 (the first SB 10A, the second SB 10B, the third SB 10C and the fourth SB 10D) accommodated in and connected to the same.

The output queue for BC 58 may simultaneously set the BC packet from the internal output BC packet analyzing unit 54 and the external output BC packet analyzing unit 55 by utilizing a multi-port random access memory (RAM), for example.

The output queue for PP 59 may simultaneously set the PP packet from the output PP packet analyzing unit 57 and the internal cross bar 56 by utilizing the multi-port RAM, for example.

The first XBB 20A has an output selector 60 for alternatively outputting the packet accepted and set by the output queue for BC 58 or the output queue for PP 59 to the connected SB 10 for each SB 10 (the first SB 10A, the second SB 10B, the third SB 10C and the fourth SB 10D) accommodated in and connected to the same.

The first XBB 20A has the BC selector 61 for alternatively outputting the BC packet accepted and set by the input queue for BC 52 arranged for each SB 10 accommodated in and connected to the same and a PP selector 62 for alternatively outputting the PP packet accepted and set by the input queue for PP 53 arranged for each SB 10 accommodated in and connected to the same.

The BC selector 61 transfers the alternatively output BC packet to the second XBB 20B via the BC bus 41 and allows the BC packet to have latency through a first in first out (FIFO) 63, and sequentially transfers the BC packet allowed to have the latency to the internal output BC packet analyzing unit 54 arranged for each accommodated and connected SB 10.

When a plurality of BC packets to the same target are simultaneously input, the BC selector 61 alternatively outputs them to the BC bus 41 on a side of the second XBB 20B and the FIFO 63 based on priority control algorithm such as least recently used (LRU).

The FIFO 63 adjusts time such that the BC packet from the BC selector 61 simultaneously arrives at the output queue for BC 58 in the first XBB 20A and the output queue for BC 58 on a side of the second XBB 20.

The PP selector 62 transfers to output the alternatively output PP packet to the second XBB 20B via the PP bus 42.

The first XBB 20A has an interface controller for SCF (hereinafter, simply referred to as SCFI) 64, which communicates with and connects to the SCF 30, for controlling an entire first XBB 20A based on an instruction of the SCF 30.

Figure 3:
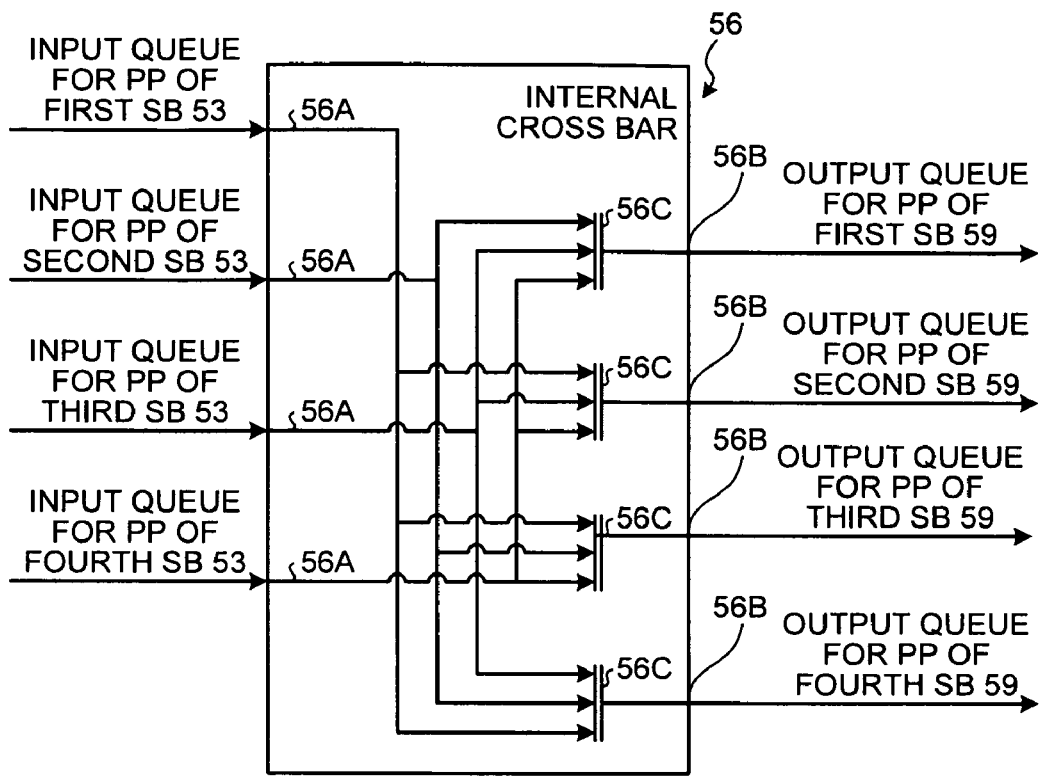
FIG. 3 is a block diagram illustrating a schematic configuration in an inner cross bar in the first XBB.

FIG. 3 is a block diagram illustrating a schematic configuration in an internal cross bar 56 in the first XBB 20A. Meanwhile, the internal cross bar 56 in the second XBB 20B has the same configuration as that of the internal cross bar 56 in the first XBB 20A illustrated in FIG. 3, so that overlapping description of the configuration and operation is not repeated by assigning the same reference numerals.

The internal cross bar 56 illustrated in FIG. 3 has an input port 56A connected to each input queue for PP 53 arranged for each connected SB 10, an output port 56B connected to each output queue for PP 59 arranged for each connected SB 10 and a selector 56C for alternatively outputting the PP packet input for each input port 56A to the output port 56B.

Figure 4:
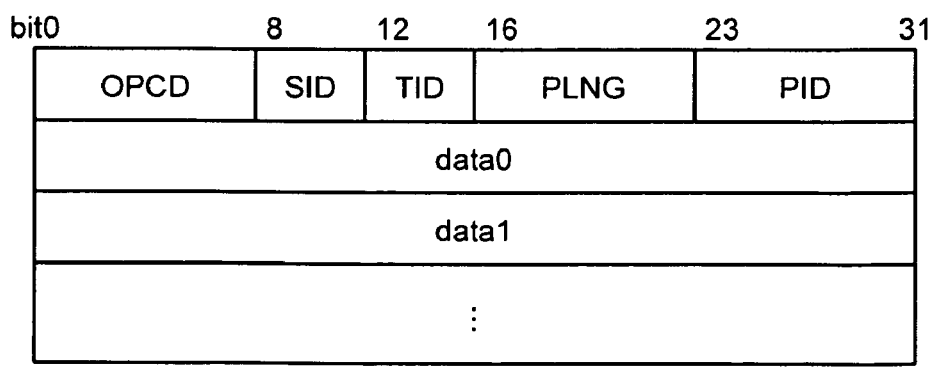
FIG. 4 is an illustrative diagram illustrating a format configuration of a PP packet (request packet)

FIG. 4 is an illustrative diagram illustrating a format configuration of the PP packet (request packet).

The PP packet (request packet) illustrated in FIG. 4 has a field including a preamble part and a data part, which stores variable-length user data.

The preamble part has the OPCD indicating a packet type, a source ID (hereinafter, simply referred to as SID) indicating a source of the packet, a target ID (hereinafter, simply referred to as TID) indicating the target of the packet, packet length (hereinafter, simply referred to as PLNG) of the packet and a packet ID (hereinafter, simply referred to as PID) to identify the packet.

The PP packet (request packet) is the packet for requesting transfer of store data to the memory 13 and access to the input/output controller 12. A store address and the store data, an access address to the input/output controller 12 and the user data are stored in the data part of the PP packet (request packet).

FIG. 5 is an illustrative diagram illustrating a format configuration of the PP packet (response packet).

The preamble part of the PP packet (response packet) illustrated in FIG. 5 has the OPCD, the SID, the TID, the PLNG and the PID corresponding to the request packet as the PP packet (request packet). Further, the PP packet (response packet) has a return code (hereinafter, simply referred to as RTCD) indicating whether the request of the request packet is successful, a response source ID (hereinafter, simply referred to as RSID) indicating a response source of the PP packet (response packet) and a response packet ID (hereinafter, simply referred to as RPID) to identify the response packet.

FIG. 6 is an illustrative diagram illustrating a format configuration of the BC packet (request packet).

The preamble part of the BC packet (request packet) illustrated in FIG. 6 has the OPCD, the SID, the PLNG and the PID as the PP packet. The BC packet (request packet) is used when requesting cache snoop and the like for securing synchronization of a cache line. Further, the BC packet is provided with the field of an address storage unit for storing a snoop address.

FIG. 7 is an illustrative diagram illustrating a format configuration of the BC packet (response packet).

The preamble part of the BC packet (response packet) illustrated in FIG. 7 has the RTCD, the RSID and the RPID in addition to the OPCD, the SID, the PLNG and the PID associated with the BC packet (request packet) as the BC packet (request packet). Then, a code indicating a cache state (hit, miss-hit, exclusive, share) and the like is stored in the RTCD.

FIG. 8 is an illustrative diagram illustrating a format configuration of an error notification packet.

The error notification packet illustrated in FIG. 8 has an error level (hereinafter, simply referred to as ERLV) indicating an error scale of an error detection site, a partition ID (hereinafter, simply referred to as PTID) to identify the partition of the error detection site, an error unit type (hereinafter, simply referred to as EUTY) indicating a unit type of the error detection site and an error unit ID (hereinafter, simply referred to as EUID) to identify a unit of the error detection site in addition to the OPCD and the SID.

As the error detection site, the CPU 11, the input/output controller 12, the memory 13, the SC 14 and the XBB interface 15 in the SB 10 may also be identified in addition to the XBB 20 and the SB 10 based on the EUTY and the EUID.

The ERLV is composed of three steps, which are level 1, level 2 and level 3, for example, in which the error of a scale within the SB 10 such as the CPU 11, the input/output controller 12 and the memory 13 corresponds to the level 1.

The error of a common site in the SC 14, for example, a site, which affects the entire SB 10 upon failure, such as a shared buffer and the controller other than the CPU 11, the input/output controller 12 and the memory 13, that is to say, a partition-scale error corresponds to the level 2. Also, the error of a scale of an entire system including a plurality of partitions in the XBB 20 corresponds to the level 3.

Figure 9:
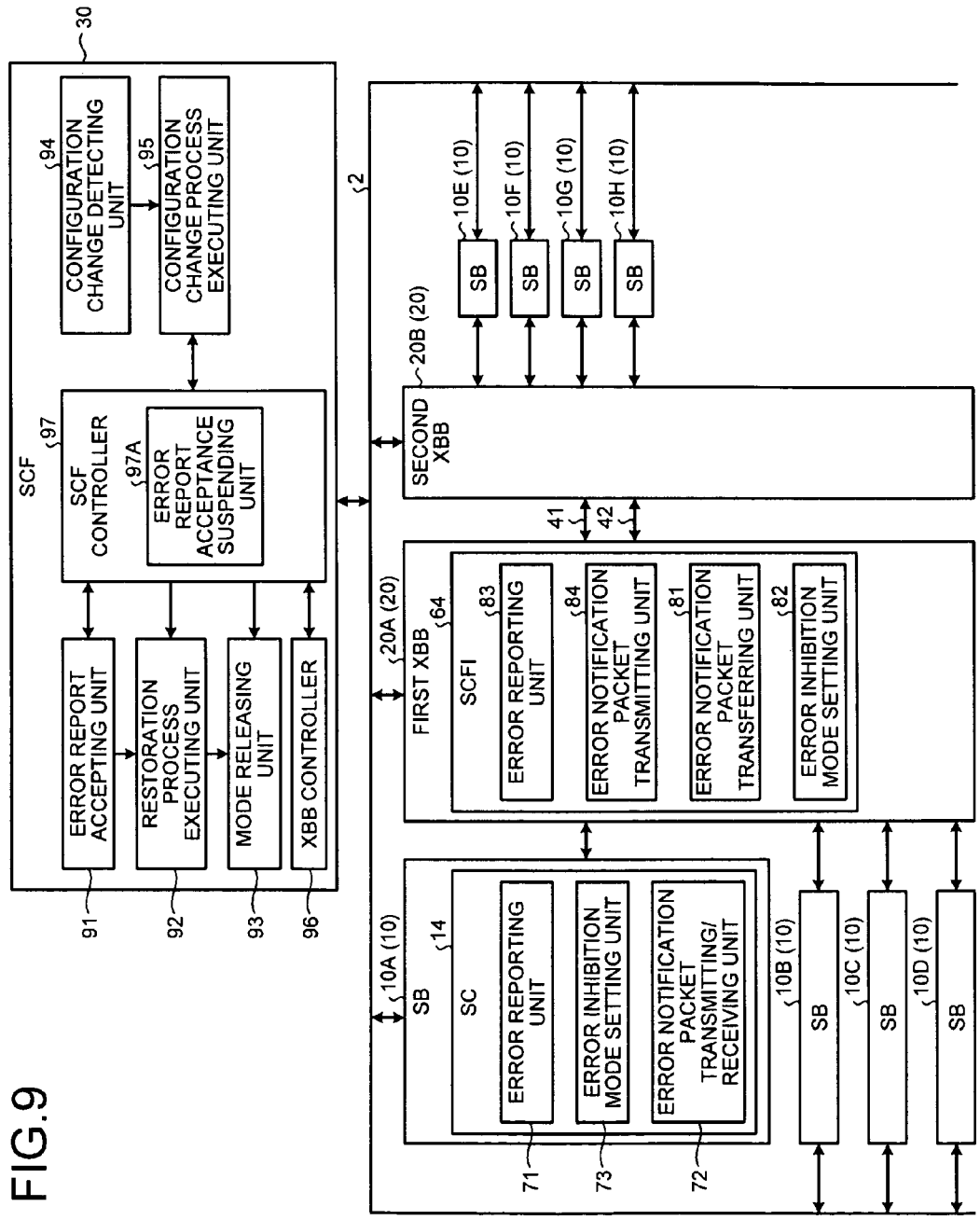
FIG. 9 is a block diagram illustrating a schematic configuration in an SC of the SB, an SCFI of the XBB and an SCF being substantial parts of the information processing device.

FIG. 9 is a block diagram illustrating a schematic configuration in the SC 14 of the SB 10, the SCFI 64 of the XBB 20 and the SCF 30, which are substantial parts of the information processing device 1.

The SC 14 in the SB 10 illustrated in FIG. 9 has an error reporting unit 71 for notifying the SCF 30 of an error report via the control line 2 by serving as an error reporting circuit when detecting occurrence of the error.

The error reporting unit 71 notifies the SCF 30 of the error report including the error detection site and the ERLV via the control line 2 based on a result of detection of the occurrence of the error.

The SC 14 has an error notification packet transmitting/receiving unit 72 for transmitting the error notification packet to the SB 10 other than the error reporting circuit out of the plurality of SBs 10 via the XBB 20 by serving as the error reporting circuit when detecting the occurrence of the error and receiving the error notification packet from other error reporting circuit.

The error notification packet transmitting/receiving unit 72 generates the error notification packet including the error detection site and the ERLV and transmits the generated error notification packet to the SB 10 other than the error reporting circuit via the XBB 20.

The SC 14 has an error inhibition mode setting unit 73 for setting an error inhibition mode when receiving the error notification packet from the error reporting circuit via the XBB 20.

When receiving the error notification packet, the error inhibition mode setting unit 73 inhibits unnecessary error detection operation at the error detection site based on the error detection site and the ERLV of the received error notification packet.

The SCFI 64 in the XBB 20 illustrated in FIG. 9 has an error notification packet transferring unit 81 for transferring the error notification packet based on the SID and the PTID of the error notification packet when receiving the error notification packet from the error reporting circuit and an error inhibition mode setting unit 82 for setting the error inhibition mode when transferring the error notification packet from the error reporting circuit through the error notification packet transferring unit 81.

The error notification packet transferring unit 81 executes destroy or transfer of the error notification packet by controlling the input packet analyzing unit 51, the internal output BC packet analyzing unit 54 and the external output BC packet analyzing unit 55 illustrated in FIG. 2.

When transferring the error notification packet received from the error reporting circuit through the error notification packet transferring unit 81, the error inhibition mode setting unit 82 inhibits the unnecessary error detection operation at the error detection site according to the ERLV, for example, the error detection operation at a site around the output queue for BC 58, the output queue for PP 59 and the like corresponding to the SB 10 of the error detection site based on the error detection site and the ERLV of the transferred error notification packet.

Meanwhile, the XBB 20 inhibits the error detection operation at a related site connected only to the SB 10 of the error detection site when the ERLV is the level 1 or 2, for example, when the error detection side is SB 10. Also, the XBB 20 inhibits the error detection operation at the common site in the XBB 20 when the ERLV is the level 3.

The SCFI 64 has an error reporting unit 83 for notifying the SCF 30 of the error report via the control line 2 by serving as the error reporting circuit when detecting the occurrence of the error and an error notification packet transmitting unit 84 for transmitting the error notification packet to the SB 10 other than the error reporting circuit out of the plurality of SBs 10 and other XBBs 20 by serving as the error reporting circuit when detecting the occurrence of the error.

The error reporting unit 83 notifies the SCF 30 of the error report including the error detection site and the ERLV via the control line 2 based on the result of detection of the occurrence of the error.

The error notification packet transmitting unit 84 generates the error notification packet including the error detection site and the ERLV based on the result of detection of the occurrence of the error and transfers the generated error notification packet to other SBs 10 via the BC selector 61.

The SCF 30 illustrated in FIG. 9 has an error report accepting unit 91 for accepting the error report from the error reporting circuit via the control line 2 and a restoration process executing unit 92 for executing an error restoration process for the error occurrence site based on the accepted error report when accepting the error report through the error report accepting unit 91.

The restoration process executing unit 92 collects an error log according to the error detection site and the ERLV included in the error report when accepting the error report through the error report accepting unit 91 and specifies the error occurrence site based on the collected error log to execute a degeneration process of the specified error occurrence site. Meanwhile, in the degeneration process for the error occurrence site, it depends on setting whether to execute the degeneration process in which the CPU 11 and the memory 13 disappear from the partition, for example, that is to say, the partition is not realized as the partition.

Further, the restoration process executing unit 92 executes a reset process and an initial setting process of the error occurrence site after executing the degeneration process of the error occurrence site, and thereafter starts activating the CPU 11, the input/output controller 12 and the like of the relevant site.

The SCF 30 has a mode releasing unit 93 for releasing the error inhibition mode of the SB 10 and the XBB 20 now being set via the control line 2 when the error restoration process for the error occurrence site is completed by the restoration process executing unit 92, a configuration change detecting unit 94 for detecting a configuration change instruction related to the SB 10, for example, and a configuration change process executing unit 95 for executing a configuration change process corresponding to the configuration change instruction when the configuration change instruction is detected.

The configuration change detecting unit 94 detects the configuration change, for example, the configuration change instruction to disconnect the first SB 10A from the first XBB 20A.

When the configuration change instruction to disconnect the first SB 10A from the first XBB 20A, for example, is detected, the configuration change process executing unit 95 stops access to the CPU 11, the input/output controller 12, the memory 13, the SC 14 and the XBB interface 15 in the first SB 10A via the control line 2, stores cache contents of the CPU 11 to other memory, and thereafter executes an interface disconnection process to disconnect the first SB 10A from the first XBB 20A.

The SCF 30 has an XBB controller 96 for controlling the SCFI 64 in the XBB 20 via the control line 2 and a SCF controller 97 for controlling an entire SCF 30.

The XBB controller 96 controls the packet transfer in the XBB 20 by controlling the SCFI 64 in the XBB 20.

The SCF controller 97 has an error report acceptance suspending unit 97A for suspending acceptance of the error report from the error reporting circuit until the execution of the configuration change process is completed when the error occurs during the execution of the configuration change process by the configuration change process executing unit 95.

When the error occurs during the execution of the configuration change process of the SB 10, the XBB controller 96 sets a destroy flag in the XBB 20 in order to destroy the error notification packet received from the SB 10 of which configuration change process is being executed until the execution of the configuration change process is completed. As a result, the XBB 20 controls the transfer of the error notification packet based on the destroy flag being set.

When the error occurs during the execution of the configuration change process of the SB 10, the XBB controller 96 sets a transfer inhibition flag in the XBB 20 in order to inhibit the transfer of the error notification packet to the SB 10 of which configuration change process is being executed until the execution of the configuration change process is completed. As a result, the XBB 20 controls the transfer of the error notification packet based on the transfer inhibition flag being set.

Figure 10:
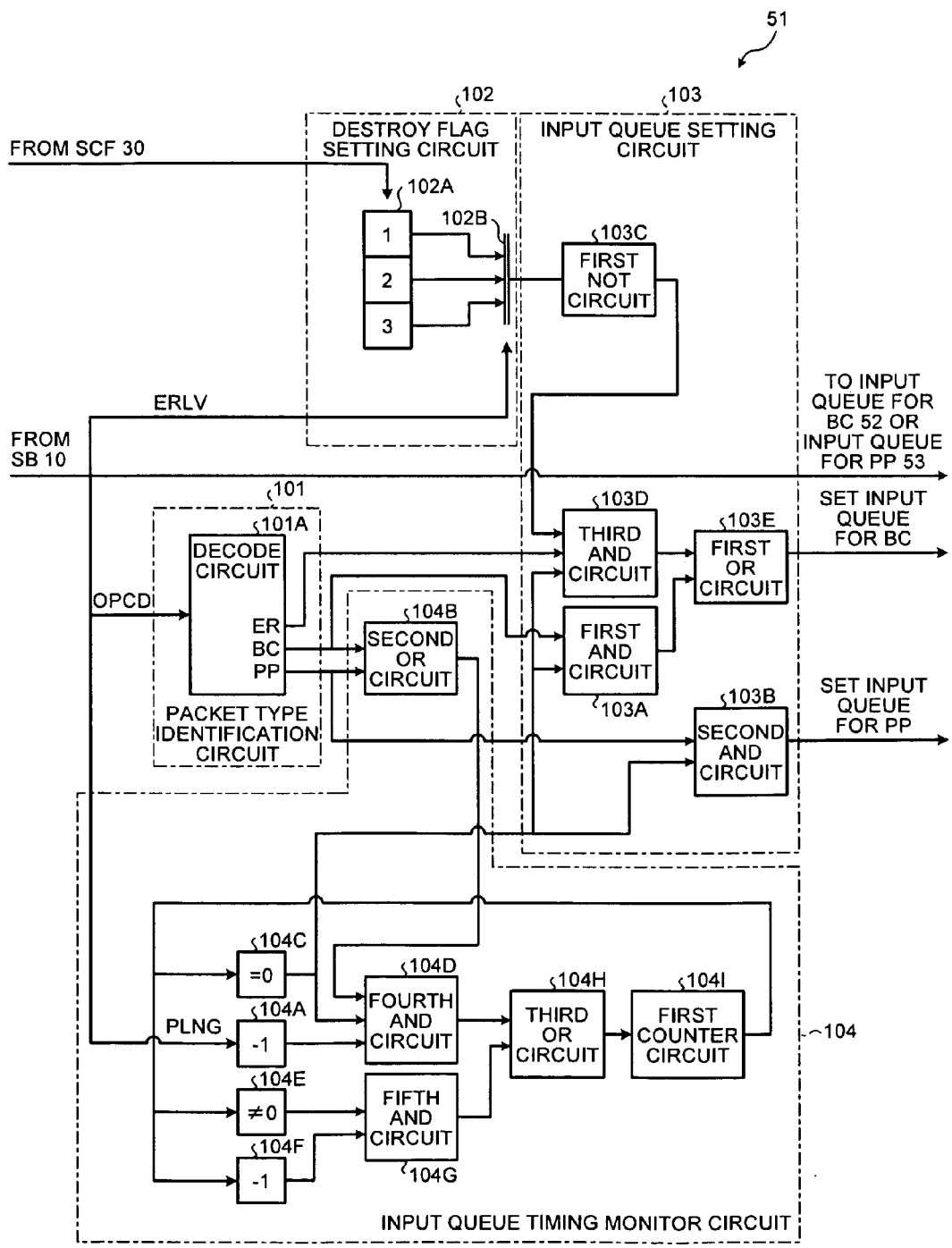
FIG. 10 is a block diagram illustrating a schematic configuration in an input packet analyzing unit of the XBB.

FIG. 10 is a block diagram illustrating a schematic configuration in the input packet analyzing unit 51 of the XBB 20. Meanwhile, one packet has packet length of the predetermined number (n) of packets, for example.

The input packet analyzing unit 51 illustrated in FIG. 10 has a packet type identification circuit 101 to identify the packet type of the received packet when receiving the packet from the connected SB 10 and a destroy flag setting circuit 102 indicating presence or absence of the setting of the destroy flag.

The packet type identification circuit 101 has a decode circuit 101A for identifying and outputting the packet type based on the OPCD of the received packet when receiving the packet from the connected SB 10. Meanwhile, the decode circuit 101A outputs a H level from a PP output when the packet type is the PP packet, outputs the H level from a BC output when the packet type is the BC packet and outputs the H level from an ER output when the packet type is the error notification packet.

The destroy flag setting circuit 102 has a destroy flag setting register 102A in which the destroy flag is set and a flag selector 102B for selectively outputting the destroy flag being set in the destroy flag setting register 102A according to the ERLV.

The input packet analyzing unit 51 has an input queue setting circuit 103 for setting the packet received from the connected SB 10 in the input queue for BC 52 or the input queue for PP 53 according to a result of identification of the packet type identification circuit 101 and an input queue timing monitor circuit 104 for monitoring timing to set in the input queue for BC 52 or the input queue for PP 53 to output the H level at the setting timing.

The input queue setting circuit 103 has a first AND circuit 103A for outputting the H level according to the H level from the BC output of the decode circuit 101A and the H level from the input queue timing monitor circuit 104 (a first zero judgment circuit 104C to be described later) and a second AND circuit 103B for outputting the H level to instruct to set the packet from the connected SB 10 in the input queue for PP 53 according to the H level from the PP output of the decode circuit 101A and the H level from the input queue timing monitor circuit 104 (the first zero judgment circuit 104C to be described later).

The input queue setting circuit 103 has a first NOT circuit 103C for outputting the H level when there is no selective output of the flag selector 102B and a third AND circuit 103D for outputting the H level according to the H level from the ER output of the decode circuit 101A, the H level from the first NOT circuit 103C and the H level from the input queue timing monitor circuit 104 (the first zero judgment circuit 104C to be described later).

The input queue setting circuit 103 has a first OR circuit 103E for outputting the H level to instruct to set the packet from the connected SB 10 in the input queue for BC 52 according to the H level from the first AND circuit 103A or the third AND circuit 103D.

The input queue timing monitor circuit 104 has a first subtraction circuit 104A for subtracting 1 from remaining packet length when receiving the packet from the connected SB 10 and a second OR circuit 104B for outputting the H level according to the H level of the BC output or the ER output of the decode circuit 101A.

The input queue timing monitor circuit 104 has the first zero judgment circuit 104C for judging that there is no remaining packet length and it is not in the middle of the packet when the remaining packet length is 0 and outputting the H level to the first AND circuit 103A, the second AND circuit 103B and the third AND circuit 103D.

The input queue timing monitor circuit 104 has a fourth AND circuit 104D for outputting a result of subtraction of the first subtraction circuit 104A according to the result of subtraction of the first subtraction circuit 104A, the H level from the second OR circuit 104B and the H level from the first zero judgment circuit 104C, a first other-than-zero judgment circuit 104E for outputting the H level when the remaining packet length is other than 0 and a second subtraction circuit 104F for subtracting 1 from the remaining packet length and outputting the result of subtraction.

The input queue timing monitor circuit 104 has a fifth AND circuit 104G for outputting the result of subtraction according to the H level from the first other-than-zero judgment circuit 104E and the result of subtraction from the second subtraction circuit 104F and a third OR circuit 104H for outputting the result of subtraction from the fourth AND circuit 104D or the result of subtraction from the fifth AND circuit 104G.

The input queue timing monitor circuit 104 has a first counter circuit 104I for counting a subtraction output from the third OR circuit 104H as the remaining packet length and the first counter circuit 104I inputs the remaining packet length as a result of count to the first zero judgment circuit 104C, the first other-than-zero judgment circuit 104E and the second subtraction circuit 104F.

When receiving the packet from the connected SB 10, the input packet analyzing unit 51 sets the received packet in the input queue for PP 53 according to the H level of the PP output from the decode circuit 101A and the H level from the first zero judgment circuit 104C through the second AND circuit 103B when the received packet is the PP packet.

When receiving the packet from the connected SB 10, the input packet analyzing unit 51 sets the received packet in the input queue for BC 52 according to the H level of the BC output from the decode circuit 101A and the H level from the first zero judgment circuit 104C through the first AND circuit 103A and the first OR circuit 103E when the received packet is the BC packet.

When receiving the packet from the connected SB 10, the input packet analyzing unit 51 sets the received packet in the input queue for BC 52 according to the H level of the ER output from the decode circuit 101A, the H level from the first zero judgment circuit 104C and the H level from the first NOT circuit 103C through the third AND circuit 103D and the first OR circuit 103E when the received packet is the error notification packet.

When the received packet is the error notification packet, even if the H level of the ER output from the decode circuit 101A and the H level from the first zero judgment circuit 104C are input through the third AND circuit 103D and the first OR circuit 103E, when an L level from the first NOT circuit 103C is input, the input packet analyzing unit 51 does not set the received packet in the input queue for BC 52 and destroys the same. Meanwhile, the L level from the first NOT circuit 103C is output when the destroy flag is being set.

Figure 11:
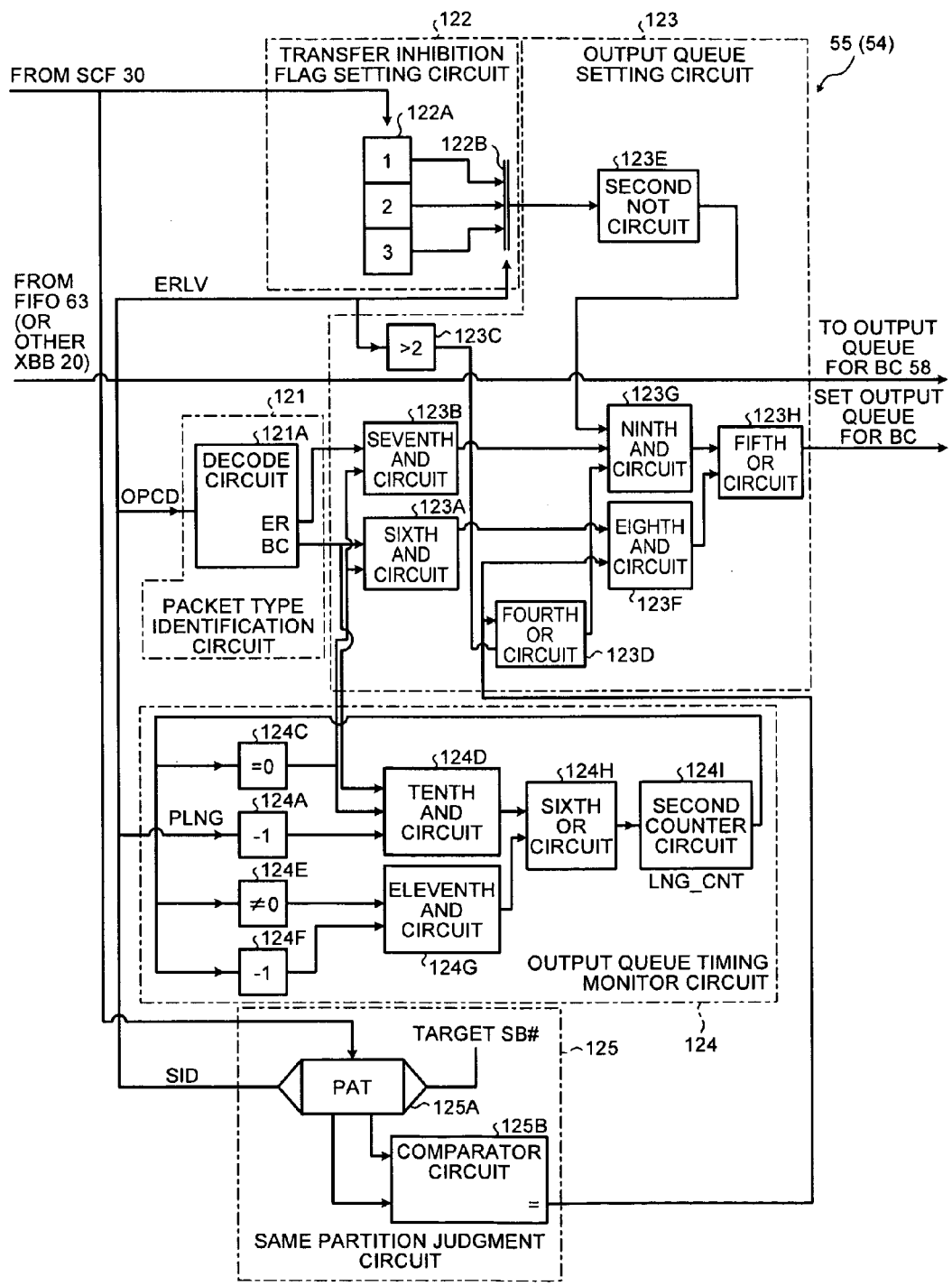
FIG. 11 is a block diagram illustrating a schematic configuration in an external output BC packet analyzing unit (internal output BC packet analyzing unit) of the XBB.

FIG. 11 is a block diagram illustrating a schematic configuration in the external output BC packet analyzing unit 55 (internal output BC packet analyzing unit 54) of the XBB 20.

The external output BC packet analyzing unit 55 illustrated in FIG. 11 has a packet type identification circuit 121 for identifying the packet type of the received packet when receiving the packet from other XBB 20 via the BC bus 41 and a transfer inhibition flag setting circuit 122 indicating presence or absence of the setting of the transfer inhibition flag.

The packet type identification circuit 121 has a decode circuit 121A for identifying and outputting the packet type based on the OPCD of the received packet when receiving the packet from other XBB 20. Meanwhile, the decode circuit 121A outputs the H level from the BC output when the packet type is the BC packet and outputs the H level from the ER output when the packet type is the error notification packet.

The transfer inhibition flag setting circuit 122 has a transfer inhibition flag setting register 122A in which the transfer inhibition flag is set and a flag selector 122B for selectively outputting the transfer inhibition flag being set in the transfer inhibition flag setting register 122A according to the ERLV.

The external output BC packet analyzing unit 55 has an output queue setting circuit 123 for setting the packet received from other XBB 20 in the output queue for BC 58 according to the result of identification of the packet type identification circuit 121.

The external output BC packet analyzing unit 55 has an output queue timing monitor circuit 124 for monitoring the timing to set in the output queue for BC 58 and outputting the H level at the setting timing and a same partition judgment circuit 125 for judging whether the packet received from other XBB 20 is of the same partition as the connected SB 10 and outputting the H level in the case of the same partition.

The output queue setting circuit 123 has a sixth AND circuit 123A for outputting the H level according to the H level from the BC output of the decode circuit 121A and the H level from the output queue timing monitor circuit 124 (a second zero judgment circuit 124C to be described later) and a seventh AND circuit 123B for outputting the H level according to the H level from the ER output of the decode circuit 121A and the H level from the output queue timing monitor circuit 124 (the second zero judgment circuit 124C to be described later).

The output queue setting circuit 123 has an ERLV judgment circuit 123C for judging whether the ERLV is the level 3 or higher and outputting the H level when the ERLV is the level 3 or higher and a fourth OR circuit 123D for outputting the H level according to the H level from the ERLV judgment circuit 123C or the H level from the same partition judgment circuit 125 (a comparator circuit 125B to be described later).

The output queue setting circuit 123 has a second NOT circuit 123E for outputting the H level when there is no selective output of the flag selector 122B and an eighth AND circuit 123F for outputting the H level in order to set the BC packet in the output queue for BC 58 according to the H level from the sixth AND circuit 123A and the H level from the same partition judgment circuit 125 (the comparator circuit 125B to be described later).

The output queue setting circuit 123 has a ninth AND circuit 123G for outputting the H level in order to set the error notification packet in the output queue for BC 58 according to the H level from the seventh AND circuit 123B, the H level from the fourth OR circuit 123D and the H level from the second NOT circuit 123E and a fifth OR circuit 123H for outputting the H level to instruct to set the packet received from other XBB 20 in the output queue for BC 58 according to the H level from the eighth AND circuit 123F or the H level from the ninth AND circuit 123G.

The output queue timing monitor circuit 124 has a third subtraction circuit 124A for subtracting 1 from the remaining packet length when receiving the packet from other XBB 20 via the BC bus 41 and a second zero judgment circuit 124C for judging that there is no remaining packet length and it is not in the middle of the packet when the remaining packet length is 0 to output the H level to the sixth AND circuit 123A and the seventh AND circuit 123B.

The output queue timing monitor circuit 124 has a tenth AND circuit 124D for outputting the result of subtraction of the third subtraction circuit 124A according to the result of subtraction of the third subtraction circuit 124A, the H level from the BC output of the decode circuit 121A and the H level from the second zero judgment circuit 124C, a second other-than-zero judgment circuit 124E for outputting the H level when the remaining packet length is other than 0 and a fourth subtraction circuit 124F for subtracting 1 from the remaining packet length to output the result of subtraction.

The output queue timing monitor circuit 124 has an eleventh AND circuit 124G for outputting the result of subtraction according to the H level from the second other-than-zero judgment circuit 124E and the result of subtraction from the fourth subtraction circuit 124F and a sixth OR circuit 124H for outputting the result of subtraction from the tenth AND circuit 124D or the result of subtraction from the eleventh AND circuit 124G.

The output queue timing monitor circuit 124 has a second counter circuit 124I for counting the subtraction output from the sixth OR circuit 124H as the remaining packet length, and the second counter circuit 124I inputs the remaining packet length as the result of count to the second zero judgment circuit 124C, the second other-than-zero judgment circuit 124E and the fourth subtraction circuit 124F.

The same partition judgment circuit 125 has a partition table 125A for managing partition relationship between the SB 10 connected to the external output BC packet analyzing unit 55 and other SBs 10 and a comparator circuit 125B for judging whether the SID of the packet received from other XBBs 20 via the BC bus 41 and the connected SB 10 are of the same partition based on the table contents of the partition table 125A and outputting the H level in the case of the same partition.

When receiving the packet from other XBB 20 via the BC bus 41, the external output BC packet analyzing unit 55 sets the received packet in the output queue for BC 58 according to the H level from the sixth AND circuit 123A and the H level from the comparator circuit 125B through the eighth AND circuit 123F and the fifth OR circuit 123H when the received packet is the BC packet.

When receiving the packet from other XBB 20 via the BC bus 41, the external output BC packet analyzing unit 55 sets the received packet in the output queue for BC 58 according to the H level from the seventh AND circuit 123B, the H level from the second NOT circuit 123E and the H level from the fourth OR circuit 123D when the received packet is the error notification packet.

When the received packet is the error notification packet, even if the H level from the seventh AND circuit 123B and the fourth OR circuit 123D are input through the ninth AND circuit 123G and the fifth OR circuit 123H, when the L level from the second NOT circuit 123E is input, the external output BC packet analyzing unit 55 does not set the received packet in the input queue for BC 52 and destroys the same, that is to say, this inhibits the transfer of the same. Meanwhile, the L level from the second NOT circuit 123E is output when the transfer inhibition flag is set.

Meanwhile, although the external output BC packet analyzing unit 55 for receiving the packet from other XBB 20 via the BC bus 41 is illustrated in FIG. 11, the internal output BC packet analyzing unit 54 for receiving the packet via the FIFO 63 also has the substantially same configuration as the internal configuration of the external output BC packet analyzing unit 55, so that the overlapping description of the configuration and operation is omitted.

Figure 12:
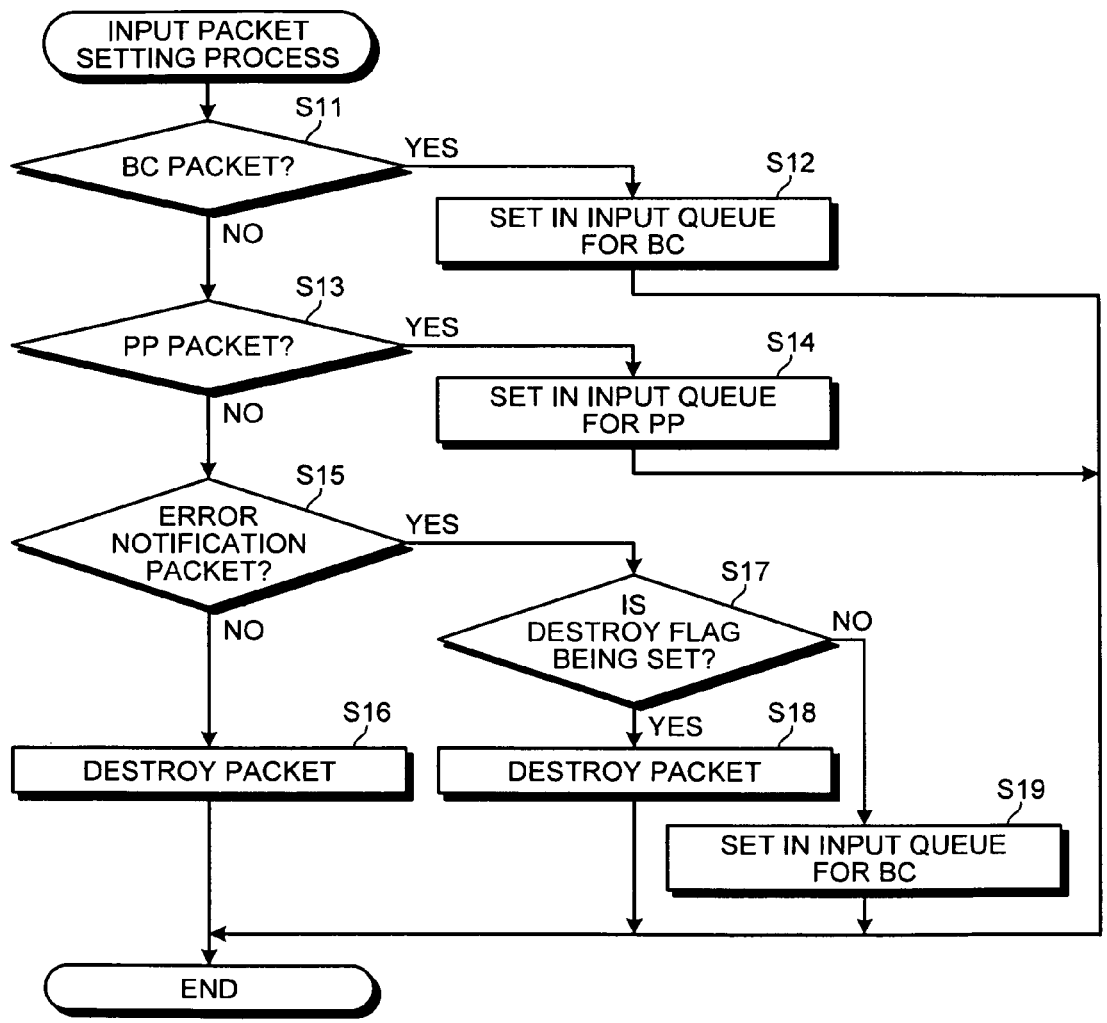
FIG. 12 is a flowchart illustrating processing operation in the input packet analyzing unit related to an input packet setting process.

Next, the operation of the information processing device 1 representing this embodiment is described. FIG. 12 is a flowchart illustrating processing operation in the input packet analyzing unit 51 related to an input packet setting process.

The input packet setting process illustrated in FIG. 12 is a process on a side of the input packet analyzing unit 51 in which, when the packet from the SB 10 accumulated in and connected to the XBB 20 is received, the received packet is analyzed and the packet is transferred to a predetermined target based on the result of analysis.

In FIG. 12, when receiving the packet from the SB 10 accommodated in and connected to the same, the input packet analyzing unit 51 in the XBB 20 analyzes the packet type based on the OPCD of the received packet and judges whether the packet type is the BC packet (step S11).

When the packet type is the BC packet (step S11: Yes), the input packet analyzing unit 51 sets the received BC packet in the input queue for BC 52 (step S12) and terminates the processing operation in FIG. 12.

When the packet type is not the BC packet (step S11: No), the input packet analyzing unit 51 judges whether the packet type is the PP packet (step S13).

When the packet type is the PP packet (step S13: Yes), the input packet analyzing unit 51 sets the received PP packet in the input queue for PP 53 (step S14) and terminates the processing operation in FIG. 12.

When the packet type is not the PP packet (step S13: No), the input packet analyzing unit 51 judges whether the packet type is the error notification packet (step S15).

When the packet type is not the error notification packet (step S15: No), the input packet analyzing unit 51 destroys the received packet (step S16) and terminates the processing operation in FIG. 12.

When the packet type is the error notification packet (step S15: Yes), the input packet analyzing unit 51 judges whether the destroy flag is being set (step S17). Meanwhile, the presence or absence of the setting of the destroy flag is set in a side of the XBB controller 96 of the SCF 30 when executing the configuration change process for the SB 10 connected to the input packet analyzing unit 51.

When the destroy flag is being set (step S17: Yes), the input packet analyzing unit 51 judges that the connected SB 10 is the SB 10 of which configuration change process is being executed, destroys the error notification packet received from the SB 10 of which configuration change process is being executed (step S18) and terminates the processing operation in FIG. 12.

When the destroy flag is not being set (step S17: No), the input packet analyzing unit 51 sets the received error notification packet in the input queue for BC 52 (step S19) in order to transfer the error notification packet received from the connected SB 10 to other SB 10 according to the ERLV and terminates the processing operation in FIG. 12.

As a result, when transferring the error notification packet to other SB 10 according to the setting of the error notification packet in the input queue for BC 52, the error inhibition mode setting unit 82 in the SCFI 64 sets the error inhibition mode based on the ERLV of the error notification packet.

According to the input packet setting process illustrated in FIG. 12, the input packet analyzing unit 51 is arranged for each connected SB 10, and when this receives the packet from the connected SB 10, this may set the BC packet in the input queue for BC 52 when the received packet is the BC packet and may set the PP packet in the input queue for PP 53 when the received packet is the PP packet.

In the input packet setting process, the input packet analyzing unit 51 is arranged for each connected SB 10, and it is configured such that, when this receives the packet from the connected SB 10, this judges whether the destroy flag is being set when the received packet is the error notification packet, judges that the connected SB 10 is the SB 10 of which configuration change process is being executed when the destroy flag is being set and destroys the error notification packet as the error reporting circuit from the SB 10 of which configuration change process is being executed. As a result, when the error occurs in the SB 10 of which configuration change process is being executed, the error notification packet for the SB 10 of which configuration change process is being executed is ignored in the SB 10 other than the SB 10 of which configuration change process is being executed and the XBB 20, so that they do not shift to the error inhibition mode.

Figure 13:
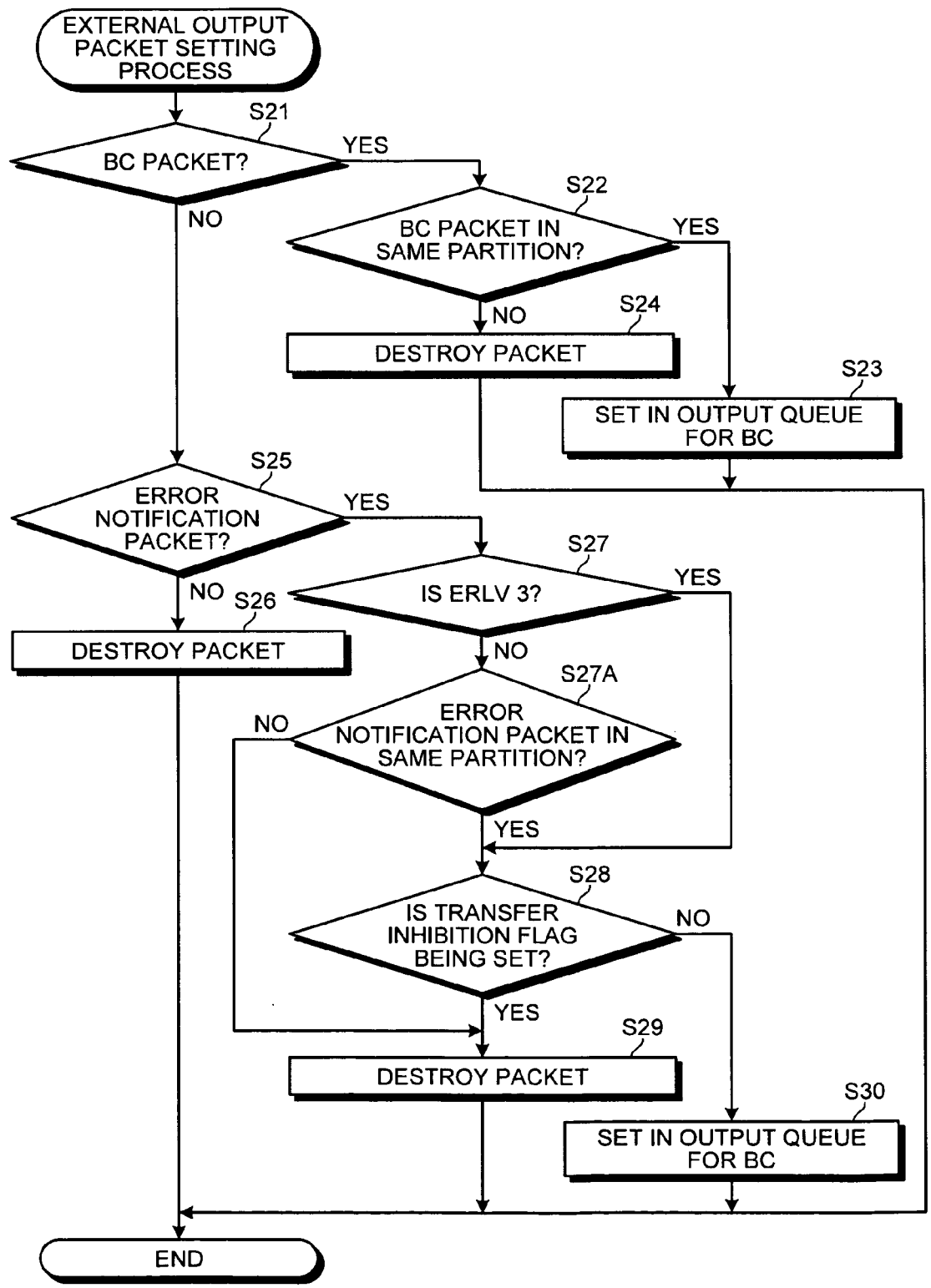
FIG. 13 is a flowchart illustrating the processing operation in the external output BC packet analyzing unit related to the external output packet setting process.

FIG. 13 is a flowchart illustrating processing operation in the external output BC packet analyzing unit 55 related to an external output packet setting process.

The external output packet setting process illustrated in FIG. 13 is a process on a side of the external output BC packet analyzing unit 55 in which, when the packet is received via the BC bus 41, the received packet is analyzed and the packet is transferred to the predetermined target based on the result of analysis.

The external output BC packet analyzing unit 55 arranged for each SB 10 in the XBB 20 analyzes the OPCD of the packet received via the BC bus 41 and judges whether the packet type is the BC packet (step S21).

When the packet type is the BC packet (step S21: Yes), the external output BC packet analyzing unit 55 judges whether the received BC packet is the BC packet from the SB 10 in the same partition (step S22). Meanwhile, the external output BC packet analyzing unit 55 judges whether the received BC packet is of the same partition based on the SID in the BC packet and the table contents of the partition table.

When the received BC packet is the BC packet from the SB 10 in the same partition (step S22: Yes), the external output BC packet analyzing unit 55 sets the received BC packet in the output queue for BC 58 (step S23). As a result, the output queue for BC 58 transfers the BC packet to the connected SB 10 via the output selector 60.

When the received BC packet is not the BC packet from the SB 10 in the same partition (step S22: No), the external output BC packet analyzing unit 55 destroys the received BC packet (step S24) and terminates the processing operation in FIG. 13.

When the packet type of the packet received at the step S21 is not the BC packet (step S21: No), the external output BC packet analyzing unit 55 judges whether the packet type of the received packet is the error notification packet (step S25).

When the packet type of the received packet is not the error notification packet (step S25: No), the external output BC packet analyzing unit 55 destroys the received packet (step S26) and terminates the processing operation in FIG. 13.

When the packet type of the received packet is the error notification packet (step S25: Yes), the external output BC packet analyzing unit 55 judges whether the ERLV of the received error notification packet is the level 3 (step S27).

When the ERLV of the error notification packet is not the level 3 (step S27: No), the external output BC packet analyzing unit 55 judges that the ERLV is the level 1 or 2 and judges whether the error notification packet is the error notification packet from the SB 10 in the same partition (step S27A). Meanwhile, the external output BC packet analyzing unit 55 judges whether the received error notification packet is the error notification packet of the same partition based on the SID in the error notification packet and the table contents of the partition table.

When the received error notification packet is the error notification packet in the same partition (step S27: Yes), the external output BC packet analyzing unit 55 judges whether the transfer inhibition flag is being set (step S28). Meanwhile, the presence or absence of the setting of the transfer inhibition flag is set in the side of the XBB controller 96 of the SCF 30 when executing the configuration change process for the SB 10 connected to the external output BC packet analyzing unit 55.

When the transfer inhibition flag is being set (step S28: Yes), the external output BC packet analyzing unit 55 judges that the connected SB 10 is the SB 10 of which configuration change process is being executed, destroys the error notification packet to be transferred to the SB 10 of which configuration change process is being executed (step S29) and terminates the processing operation in FIG. 13.

When the ERLV of the received error notification packet is the level 3 (step S27: Yes), the external output BC packet analyzing unit 55 shifts to the step S28 in order to judge whether the transfer inhibition flag is being set.

When the received error notification packet is not the error notification packet in the same partition (step S27A: No), the external output BC packet analyzing unit 55 shifts to the step S29 in order to destroy the error notification packet to be transferred to the connected SB 10.

When the transfer inhibition flag is not being set (step S28: No), the external output BC packet analyzing unit 55 sets the received error notification packet in the output queue for BC 58 (step S30) in order to transfer the error notification packet to the connected SB 10 and terminates the processing operation in FIG. 13.

As a result, when transferring the error notification mode to the connected SB 10 according to the setting of the error notification packet in the output queue for BC 58, the error inhibition mode setting unit 82 in the SCFI 64 sets the error inhibition mode based on the ERLV of the error notification packet. Further, the error inhibition mode setting unit 73 of the connected SB 10 sets to the error inhibition mode when receiving the error notification packet through the output queue for BC 58.

According to the external output packet setting process illustrated in FIG. 13, it is configured such that when the BC packet is received via the BC bus 41, the received BC packet is transferred to the SB 10 in the same partition when the received BC packet is the BC packet in the same partition and the received BC packet is destroyed when the received BC packet is not the BC packet in the same partition, so that the BC packet may be transferred only to the SB 10 in the same partition.

In the external output packet setting process, it is configured such that, when the error notification packet is received via the BC bus 41, even if the received error notification packet is the error notification packet in the same partition, it is judged whether the transfer inhibition flag is being set, and it is judged that the connected SB 10 is the SB 10 of which configuration change process is being executed when the transfer inhibition flag is being set, and the error notification packet to the SB 10 of which configuration change process is being executed is inhibited from being transferred, for example, destroyed. As a result, even if the error occurs during the execution of the configuration change process of the SB 10, the error notification packet during the execution of the configuration change process is ignored in the SB 10 of which configuration change process is being executed by inhibiting the transfer of the error notification packet from being transferred to the SB 10 of which configuration change process is being executed, so that this does not shift to the error inhibition mode.

Figure 14:
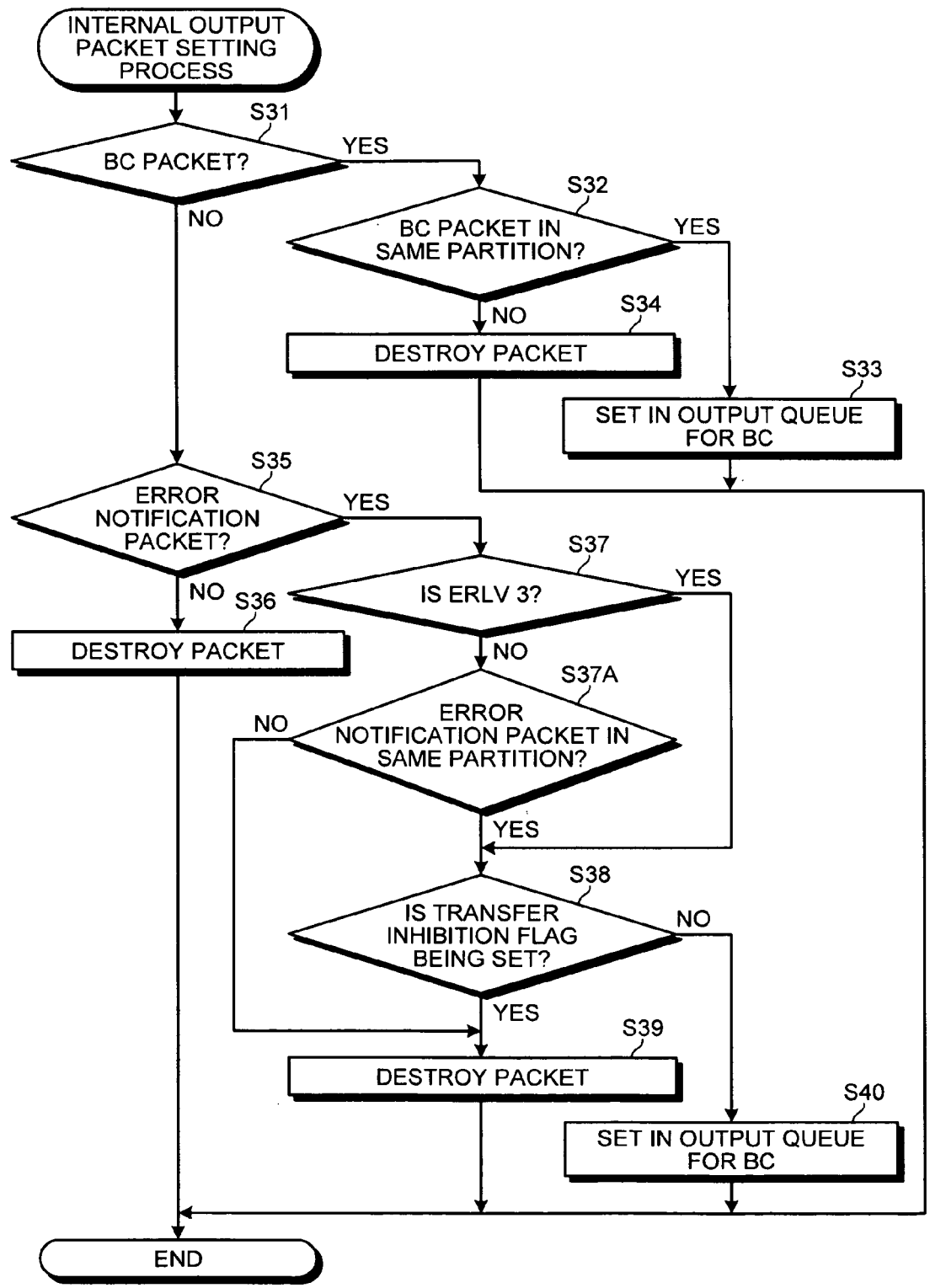
FIG. 14 is a flowchart illustrating the processing operation in the internal output BC packet analyzing unit related to an internal output packet setting process.

FIG. 14 is a flowchart illustrating processing operation in the internal output BC packet analyzing unit 54 related to an internal output packet setting process.

The internal output packet setting process illustrated in FIG. 14 is a process on a side of the internal output BC packet analyzing unit 54 in which, when the packet is internally received via the FIFO 63, the received packet is analyzed and the packet is transferred to an internal predetermined target based on the result of analysis.

The internal output BC packet analyzing unit 54 arranged for each SB 10 accommodated in and connected to the XBB 20 analyzes the OPCD of the packet received from the connected SB 10 via the BC selector 61 and judges whether the packet type is the BC packet (step S31).

When the packet type is the BC packet (step S31: Yes), the internal output BC packet analyzing unit 54 judges whether the received BC packet is the BC packet from the SB 10 in the same partition (step S32). Meanwhile, the internal output BC packet analyzing unit 54 judges whether the received BC packet is in the same partition based on the SID in the BC packet and the table contents of the partition table.

When the received BC packet is the BC packet from the SB 10 in the same partition (step S32: Yes), the internal output BC packet analyzing unit 54 sets the received BC packet in the output queue for BC 58 (step S33). As a result, the output queue for BC 58 transfers the BC packet to the connected SB 10 via the output selector 60.

When the received BC packet is not the BC packet from the SB 10 in the same partition (step S32: No), the internal output BC packet analyzing unit 54 destroys the received BC packet (step S34) and terminates the processing operation in FIG. 14.

When the packet type of the packet received at the step S31 is not the BC packet (step S31: No), the internal output BC packet analyzing unit 54 judges whether the packet type of the received packet is the error notification packet (step S35).

When the packet type of the received packet is not the error notification packet (step S35: No), the internal output BC packet analyzing unit 54 destroys the received packet (step S36) and terminates the processing operation in FIG. 14.

When the packet type of the received packet is the error notification packet (step S35: Yes), the internal output BC packet analyzing unit 54 judges whether the ERLV of the received error notification packet is the level 3 (step S37).

When the ERLV is not the level 3 (step S37: No), the internal output BC packet analyzing unit 54 judges that this is the level 1 or 2 and judges whether the received error notification packet is the error notification packet from the SB 10 in the same partition (step S37A). Meanwhile, the internal output BC packet analyzing unit 54 judges whether the received error notification data is the error notification packet of the same partition based on the SID in the error notification packet and the table contents of the partition table.

When the received error notification packet is the error notification packet in the same partition (step S37A: Yes), the internal output BC packet analyzing unit 54 judges whether the transfer inhibition flag is being set (step S38). Meanwhile, the presence or absence of the setting of the transfer inhibition flag is set in the side of the XBB controller 96 of the SCF 30 when executing the configuration change process for the SB 10 connected to the internal output BC packet analyzing unit 54.

When the transfer inhibition flag is being set (step S38: Yes), the internal output BC packet analyzing unit 54 judges that the connected SB 10 is the SB 10 of which configuration change process is being executed, destroys the error notification packet to be transferred to the SB 10 of which configuration change process is being executed (step S39) and terminates the processing operation in FIG. 14.

When the ERLV of the error notification packet received at the step S37 is the level 3 (step S37: Yes), the internal output BC packet analyzing unit 54 shifts to the step S38 in order to judge whether the transfer inhibition flag is being set.

When the received error notification packet is not the error notification packet in the same partition (step S37A: No), the internal output BC packet analyzing unit 54 shifts to the step S39 in order to destroy the error notification packet to be transferred to the connected SB 10.

When the transfer inhibition flag is not being set (step S38: No), the internal output BC packet analyzing unit 54 sets the received error notification packet in the output queue for BC 58 in order to transfer the error notification packet to the connected SB 10 (step S40) and terminates the processing operation in FIG. 14.

As a result, the error inhibition mode setting unit 82 in the SCFI 64 sets the error inhibition mode based on the ERLV of the error notification packet when transferring the error notification packet to the connected SB 10 according to the setting of the error notification packet of the output queue for BC 58. Further, the error inhibition mode setting unit 73 in the connected SB 10 sets the error inhibition mode when receiving the error notification packet through the output queue for BC 58.

According to the internal output packet setting process illustrated in FIG. 14, it is configured such that, when the BC packet is received via the FIFO 63, the received BC packet is transferred to the SB 10 in the same partition when the received BC packet is the BC packet in the same partition, and the received BC packet is destroyed when the received BC packet is not the BC packet in the same partition, so that the BC packet may be transferred only to the SB 10 in the same partition.

According to the internal output packet setting process, it is configured such that, when the error notification packet is received via the FIFO 63, even if the received error notification packet is the error notification packet in the same partition, it is judged whether the transfer inhibition flag is being set and it is judged that the connected SB 10 is the SB 10 of which configuration change process is being executed when the transfer inhibition flag is being set and the error notification packet is inhibited from being transferred to the SB 10 of which configuration change process is being executed, for example, destroyed. As a result, if when the error occurs during the execution of the configuration change process of the SB 10, the error notification packet during the execution of the configuration change process is ignored in the SB 10 of which configuration change process is being executed by inhibiting the error notification packet from being transferred to the SB 10 of which configuration change process is being executed, so that this does not shift to the error inhibition mode.

FIG. 15 is an illustrative diagram illustrating operation in the information processing device 1 when the error of the level 2 occurs in the first SB 10A.

When detecting the occurrence of the error of the level 2, for example, the SC 14 in the first SB 10A illustrated in FIG. 15 notifies the SCF 30 of the error report via the control line 2 through the error reporting unit 71.

When detecting the occurrence of the error of the level 2, the SC 14 in the first SB 10A generates the error notification packet of the level 2 through the error notification packet transmitting/receiving unit 72 and notifies the input packet analyzing unit 51 on a side of the connected first XBB 20A of the generated error notification packet of the level 2.

When receiving the error notification packet of the level 2 from the first SB 10A, the input packet analyzing unit 51 connected to the first SB 10A judges whether the destroy flag is being set, and when the destroy flag is not being set, this sets the received error notification packet in the input queue for BC 52 connected to the first SB 10A. As a result, when setting the error notification packet in the input queue for BC 52, the first XBB 20A sets in the error inhibition mode to inhibit the error detection operation of the error detection site according to the level 2 of the error notification packet.

The input queue for BC 52 connected to the first SB 10A transfers the set error notification packet of the level 2 from the first SB 10A to each external output BC packet analyzing unit 55 in the second XBB 20B via the BC selector 61 and the BC bus 41 and transfers the same to each internal output BC packet analyzing unit 54 in the first XBB 20A via the BC selector 61 and the FIFO 63.

First, when each external output BC packet analyzing unit 55 connected to the fifth SB 10E and the sixth SB 10F on the side of the second XBB 20B receives the error notification packet of the level 2 from the first SB 10 via the first XBB 20A, since the partition is the same as that of the first SB 10A, this transfers the received error notification packet of the level 2 to the fifth SB 10E and the sixth SB 10F via the output queue for BC 58 and the output selector 60.

As a result, when the error notification packet is set in the output queue for BC 58 and the error notification packet is transferred to the fifth SB 10E and the sixth SB 10F, the error inhibition mode setting unit 82 of the second XBB 20B sets the error inhibition mode to inhibit the error detection operation of the error detection site according to the level 2 of the error notification packet. Also, when receiving the error notification packet of the level 2 from the first SB 10A, the error inhibition mode setting unit 73 of the fifth SB 10E and the sixth SB 10F sets the error inhibition mode to inhibit the error detection operation of the error detection site.

When each external output BC packet analyzing unit 55 connected to the seventh SB 10G and the eighth SB 10H on the side of the second XBB 20B receives the error notification packet of the level 2 from the first SB 10 via the first XBB 20A, since the partition is different from that of the first SB 10A, this destroys the received error notification packet.

Meanwhile, when receiving the error notification packet of the level 3, the external output BC packet analyzing unit 55 connected to the seventh SB 10G and the eighth SB 10H does not destroy the received error notification packet and transfers the error notification packet to the seventh SB 10G and the eighth SB 10H via the output queue for BC 58 and the output selector 60.

When the internal output BC packet analyzing unit 54 connected to the second SB 10B on a side of the first XBB 20A receives the error notification packet of the level 2 of the first SB 10A via the BC selector 61 and the FIFO 63, since the partition is the same as that of the first SB 10A, this transfers the error notification packet to the second SB 10B via the output queue for BC 58 and the output selector 60.

As a result, when receiving the error notification packet of the level 2 from the first SB 10A, the error inhibition mode setting unit 73 of the second SB 10B sets the error inhibition mode to inhibit the error detection operation of the error detection site.

When the internal output BC packet analyzing unit 54 connected to the third SB 10C and the fourth SB 10D on the side of the first XBB 20A receives the error notification packet of the level 2 of the first SB 10A via the BC selector 61 and the FIFO 63, since the partition is different from that of the first SB 10A, this destroys the error notification packet from the first SB 10A.

Meanwhile, when receiving the error notification packet of the level 3, the internal output BC packet analyzing unit 54 connected to the third SB 10C and the fourth SB 10D does not destroy the received error notification packet and transfers the error notification packet to the third SB 10C and the fourth SB 10D via the output queue for BC 58 and the output selector 60.

As a result, when the occurrence of the error of the level 2 is detected in the first SB 10A, the SCF 30 is notified of the error report via the control line 2 and the error notification packet of the level 2 is transferred to the SB 10 in the same partition as the first SB 10A, for example, to the second SB 10B via the first XBB 20A and to the fifth SB 10E and the sixth SB 10F via the first XBB 20A and the second XBB 20B.

Then, the second SB 10B, the fifth SB 10E, the sixth SB 10F, the first XBB 20A and the second XBB 20B receive the error notification packet of the level 2 from the first SB 10A, thereby setting the error inhibition mode.

When the occurrence of the error of the level 3 is detected in the first SB 10A, for example, the SCF 30 is notified of the error report via the control line 2 and the error notification packet of the level 3 is transferred to all the SBs 10 via the first XBB 20A and the second XBB 20B.

As a result, when all the SBs 10 and all the XBBs 20 receive the error notification packet of the first SB 10A, they set the error inhibition mode.

When the restoration process executing unit 92 on a side of the SCF 30 accepts the error report of the level 2 from the first SB 10A, this collects the error log based on the ERLV and the error detection site related to the error report, specifies the error occurrence site based on a result of collection, and executes the error restoration process for the specified error occurrence site.

When the error restoration process for the error occurrence site is completed by the restoration process executing unit 92, the mode releasing unit 93 on the side of the SCF 30 releases the error inhibition mode being set in the first XBB 20A, the second XBB 20B, the second SB 10B, the fifth SB 10E and the sixth SB 10F via the control line 2.

Figure 16:
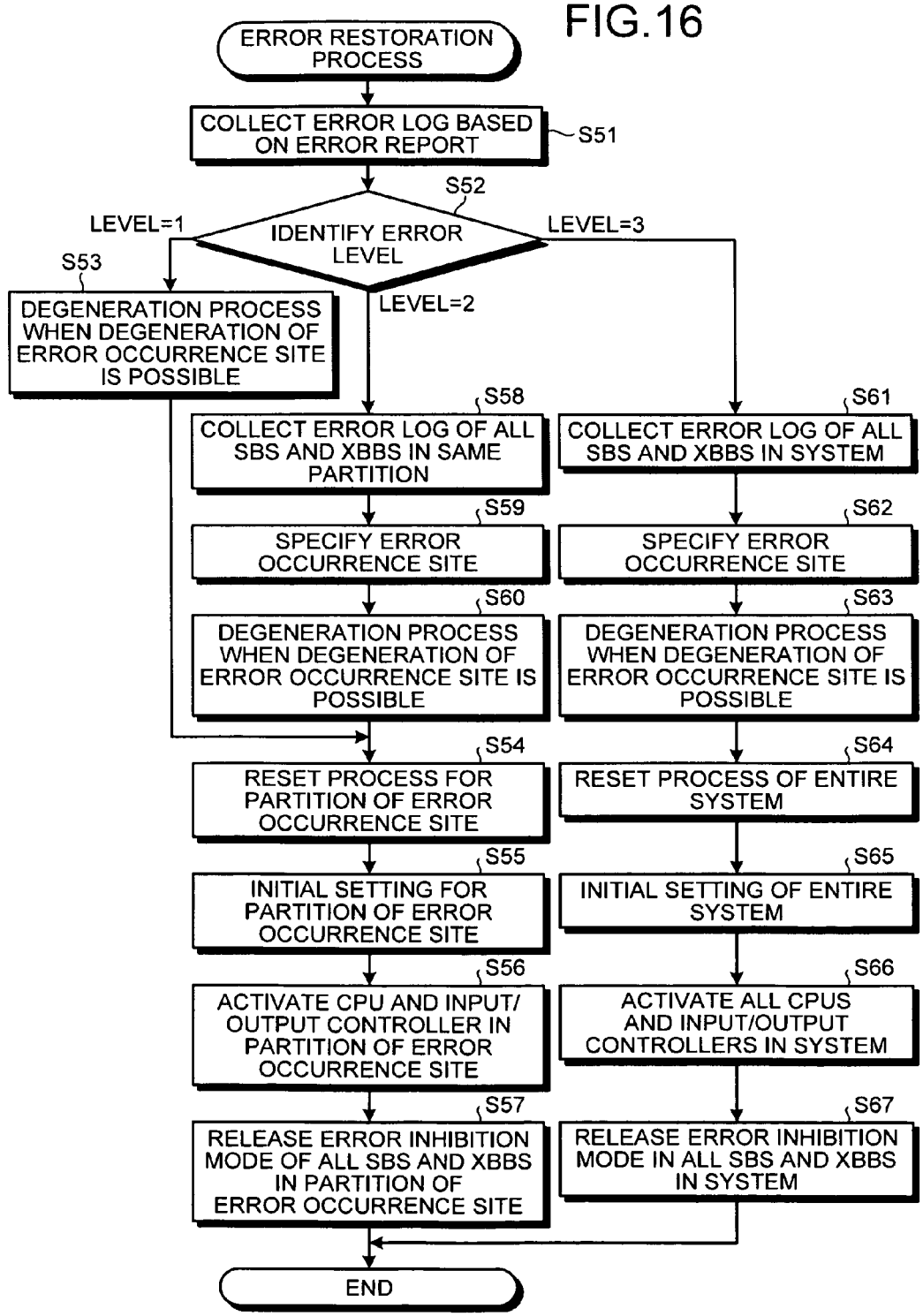
FIG. 16 is a flowchart illustrating the processing operation in the SCF related to an error restoration process.

Next, operation of the SCF 30, which accepts the error report, is described. FIG. 16 is a flowchart illustrating processing operation in the SCF 30 related to the error restoration process.

The error restoration process illustrated in FIG. 16 is a process in which, when the error report is accepted from the error reporting circuit via the control line 2, the error occurrence site is specified from the ERLV and the error detection site based on the error report and the error restoration process is executed for the specified error occurrence site.

In FIG. 16, when accepting the error report via the control line 2 through the error report accepting unit 91, the restoration process executing unit 92 collects the error log of the error detection site based on the error report (step S51) and identifies the ERLV based on the error report (step S52).

The restoration process executing unit 92 recognizes the ERLV, and when the ERLV is the level 1, this makes the error detection site the error occurrence site, executes the degeneration process when the degeneration of the error occurrence site is possible (step S53) and executes the reset process for restoration for the partition of the error occurrence site (step S54). Meanwhile, when executing the reset process for the restoration for the partition of the error occurrence site, in a case of the XBB 20 accommodating and connecting the SB 10 belonging to a plurality of partitions, for example, a partial reset process is executed so as not to affect the SB 10 accommodated in and connected to the partition other than the partition of the error occurrence site.

When executing the reset process for the restoration for the partition of the error occurrence site, the restoration process executing unit 92 executes initial setting of the error occurrence site (step S55) and activates the CPU 11 and the input/output controller 12 in all the SBs 10 in the partition of the error occurrence site (step S56).

When the CPU 11 and the input/output controller 12 in all the SBs 10 in the partition of the error occurrence site is activated at the step S56, the mode releasing unit 93 releases the error inhibition mode being set in all the SBs 10 and the XBBs 20 in the partition of the error occurrence site through the mode releasing unit 93 (step S57) and terminates the processing operation in FIG. 16.

When the ERLV is the level 2 at the step S52, the restoration process executing unit 92 collects the error log of all the SBs 10 and the XBBs 20 in the same partition as the SB 10 of the error detection site (step S58), specifies the error occurrence site based on the result of collection of the error log (step S59), executes the degeneration process when the degeneration of the error occurrence site is possible (step S60) and shifts to the step S54 in order to execute the reset process for the restoration for the partition of the error occurrence site.

When the ERLV is the level 3 at the step S52, the restoration process executing unit 92 collects the error log of all the SBs 10 and all the XBBs 20 in the system (step S61) and specifies the error occurrence site based on the result of collection of the error log (step S62).

When specifying the error occurrence site at the step S62, the restoration process executing unit 92 executes the degeneration process when the degeneration of the error occurrence site is possible (step S63) and executes the reset process for the restoration for the entire system (step S64).

When executing the reset process of the entire system at the step S64, the restoration process executing unit 92 executes the initial setting of the entire system (step S65), activates all the CPUs 11 and all the input/output controllers 12 in all the SBs 10 in the system (step S66), releases the error inhibition mode being set in all the SBs 10 and all the XBBs 20 in the system through the mode releasing unit 93 (step S67) and terminates the processing operation in FIG. 16.

In the error restoration process illustrated in FIG. 16, when the error report is accepted via the control line 2, the error detection site and the ERLV are recognized based on the error report, the error occurrence site corresponding to the error detection site and the ERLV is specified, the degeneration process, the reset process, the initial setting process and the activation process for the specified error occurrence site are executed, and the error inhibition mode of the SB 10 and the XBB 20 being set is released. As a result, according to the error restoration process, the error occurrence site may be restored and the error inhibition mode being set may be released.

Figure 17:
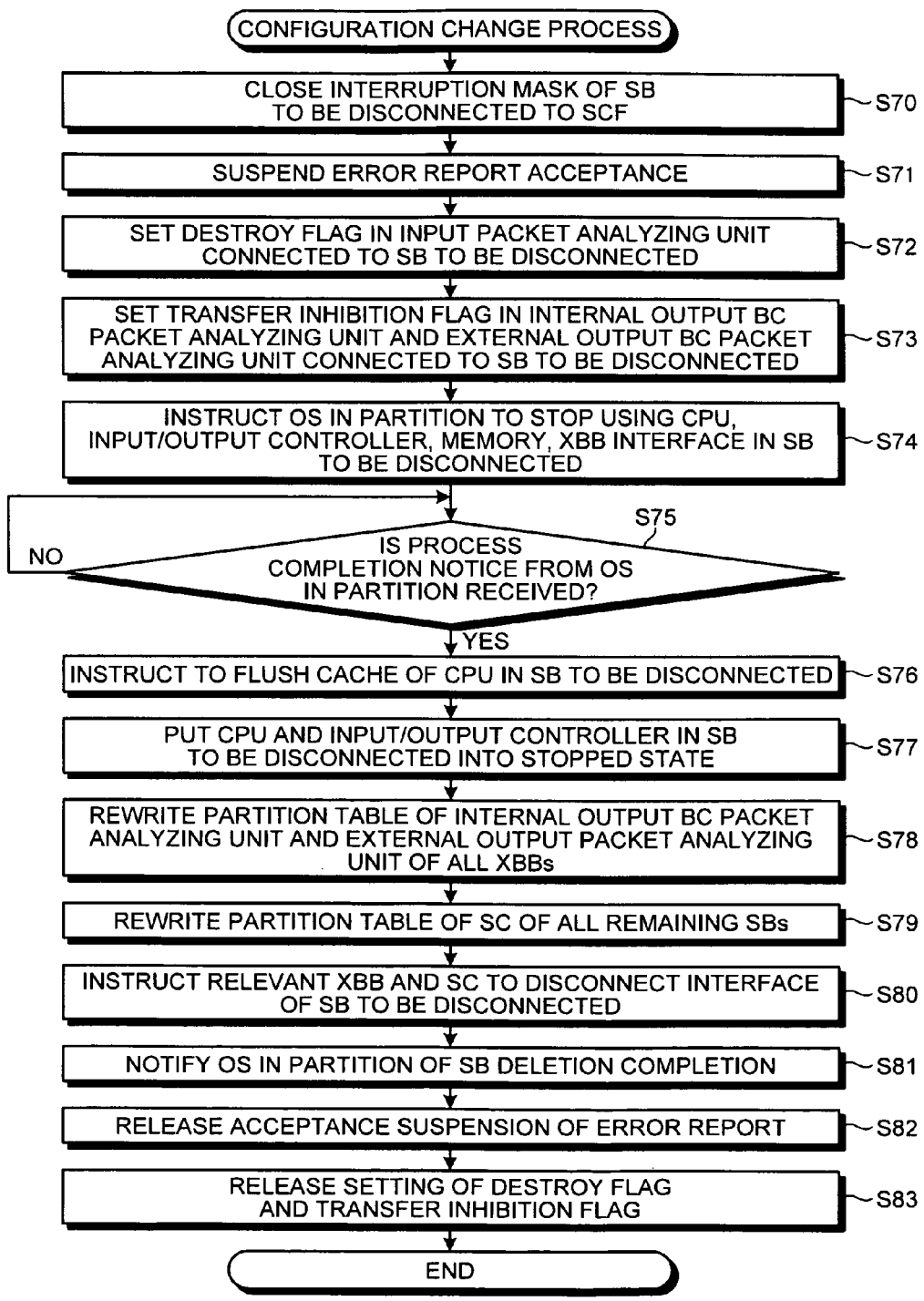
FIG. 17 is a flowchart illustrating the processing operation in the SCF related to a configuration change process.

Next, operation related to the configuration change process of the SCF 30 is described. FIG. 17 is a flowchart illustrating the processing operation in the SCF 30 related to the configuration change process.

The configuration change process illustrated in FIG. 17 is a process for executing the configuration change process to disconnect the first SB 10A from the first XBB 20A according to the change instruction of a system operational configuration, for example, the configuration change instruction to disconnect the first SB 10A belonging to the partition A from the first XBB 20A.

In FIG. 17, when the configuration change instruction is detected by the configuration change detecting unit 94, the configuration change process executing unit 95 in the SCF 30 closes an interruption mask from the SB 10 to be disconnected to the SCF 30, for example, corresponding to the configuration change instruction (step S70).

When the interruption mask from the SB 10 to be disconnected to the SCF 30 is closed through the configuration change process executing unit 95, this corresponds to the setting to suspend the acceptance of the error report via the control line 2 by an error report acceptance suspending unit 97A on a side of the SCF controller 97 (step S71).

When the acceptance of the error report is set to be suspended, the XBB controller 96 on the side of the SCF controller 97 sets the destroy flag in the input packet analyzing unit 51 in the XBB 20 connected to the SB 10 to be disconnected (step S72). Meanwhile, the input packet analyzing unit 51 connected to the SB 10 to be disconnected destroys the error notification packet from the connected SB 10 according to the setting of the destroy flag.

When setting the destroy flag in the input packet analyzing unit 51 connected to the SB 10 to be disconnected, the XBB controller 96 sets the transfer inhibition flag to inhibit the transfer of the error notification packet to the SB 10 to be disconnected in the external output BC packet analyzing unit 55 and the internal output BC packet analyzing unit 54 in the XBB 20 connected to the SB 10 to be disconnected (step S73).

Further, when the configuration change process executing unit 95 instructs the OS in the partition to stop using the CPU 11, the input/output controller 12, the memory 13, the SC 14 and the XBB interface 15 in the SB 10 to be disconnected (step S74), this judges whether to receive a process completion notification for the stop of using from the OS in the partition (step S75).

When the configuration change process executing unit 95 receives the process completion notification is received (step S75: Yes), this issues an instruction to flush cache in the CPU 11 in the SB 10 to be disconnected (step S76) and puts the CPU 11 and the input/output controller 12 in the SB 10 to be disconnected into a stopped state (step S77).

When the configuration change process executing unit 95 puts the CPU 11 and the input/output controller 12 in the SB 10 to be disconnected into the stopped state, this rewrites the partition table in order to delete the SB 10 to be disconnected from the partition table in the internal output BC packet analyzing unit 54 and the external output BC packet analyzing unit 55 of all the XBBs 20 (step S78).

Further, the configuration change process executing unit 95 similarly rewrites the partition table (not illustrated) in the SC 14 of all the remaining SBs 10 (step S79) and instructs the relevant XBB 20 and SC 14 to disconnect the interface of a side of the SB 10 to be disconnected (step S80). As a result, in the XBB 20, the packet is hereinafter destroyed by the output selector 60 connected to the SB 10 to be disconnected.

When the configuration change process executing unit 95 instructs the relevant XBB 20 and SC 14 to disconnect the interface of the SB 10 to be disconnected, this notifies the OS in the partition of completion of SB deletion (step S81). Meanwhile, when the OS receives the completion of SB deletion, this asks for a variety of processes for the SCF 30.

When the OS in the partition is notified of the completion of SB deletion, the SCF controller 97 judges that the configuration change process is completed and releases acceptance suspension of the error report at the step S71 (step S82).

Further, when the acceptance suspension of the error report is released, the XBB controller 96 on a side of the SCF controller 97 releases the destroy flag in the input packet analyzing unit 51 set at the step S72 and releases the transfer inhibition flag in the internal output BC packet analyzing unit 54 and the external output BC packet analyzing unit 55 set at the step S73 (step S83) and terminates the processing operation in FIG. 17.

When the configuration change process executing unit 95 does not receive the process completion notification is not received at the step S75 (step S75: No), this executes monitoring operation at the step S75 until receiving the process completion notification.

In the configuration change process illustrated in FIG. 17, when the configuration change instruction to disconnect the SB 10 from the XBB 20 is detected, for example, the acceptance suspension to suspend the acceptance of the error report is set on the side of the SCF 30 and the destroy flag to destroy the error notification packet from the SB 10 of which configuration change process is being executed is set in the input packet analyzing unit 51 on the side of the XBB 20 connected to the SB 10 of which configuration change process is being executed. Further, in the configuration change process, the transfer inhibition flag to inhibit the transfer of the error notification packet to the SB 10 of which configuration change process is being executed is set in the internal output BC packet analyzing unit 54 and the external output BC packet analyzing unit 55 on the side of the XBB 20 connected to the SB 10 of which configuration change process is being executed.

As a result, even if the error occurs during the execution of the configuration change process, the error notification packet from the SB 10 of which configuration change process is being executed may be destroyed and the transfer of the error notification packet to the SB 10 of which configuration change process is being executed may be inhibited.

Meanwhile, although the destroy flag and the transfer inhibition flag are set in the SB 10 of which configuration change process is being executed, in a case in which the destroy flag and the transfer inhibition flag are not set in the SB 10 of which configuration change process is being executed, for example, when the SB 10 of which configuration change process is being executed detects the occurrence of the error, the SCF 30 is notified of the error report and the error notification packet is transferred to each SB 10 via the XBB 20 to notify each SB 10 of the same. As a result, the XBB 20 and the SB 10, which receive the error notification packet, shift to the error inhibition mode.

However, on the side of the SCF 30, the SB 10 as the error reporting circuit cannot be recognized when the configuration change process of the SB 10 as the error reporting circuit is completed, so that the error inhibition mode being set in other SB 10 and XBB 20 cannot be released. If the error inhibition mode remains set in the SB 10 and the XBB 20, a case in which the occurrence of the error cannot be detected even if the error occurs thereafter might be considered.

Therefore, according to the configuration change process illustrated in FIG. 17, the destroy flag is set in the SB 10 of which configuration change process is being executed, therefore the error notification packet does not arrive at the SB 10 other than the SB 10 of which configuration change process is being executed and the XBB 20 by destroying the error notification packet from the SB 10 of which configuration change process is being executed, so that they do not shift to the error inhibition mode. As a result, a case in which the error inhibition mode remains unreleased and the occurrence of the error cannot be detected may be avoided.

In a case in which the destroy flag and the transfer inhibition flag are not set in the SB 10 of which configuration change process is being executed, when the occurrence of the error is detected in the SB 10 other than the SB 10 of which configuration change process is being executed, for example, the SCF 30 is notified of the error report and the error notification packet from the SB 10 being the error reporting circuit is transferred to other SB 10 including the SB 10 of which configuration change process is being executed and the XBB 20. As a result, the XBB 20 and the SB 10, which receive the error notification packet, shift to the error inhibition mode.

However, although the error inhibition mode being set is released when the restoration process for the SB 10 as the error reporting circuit is completed on the side of the SCF 30, since the SB 10 after the completion of the configuration change cannot be recognized when the configuration change process for the SB 10 of which configuration change process is being executed is completed on the side of the SCF 30, the error inhibition mode being set in the SB 10 after the completion of the configuration change process cannot be released. As a result, a case in which an unnecessary process to release the error inhibition mode upon restoration of the configuration of the SB 10 becomes possible may be considered.

Therefore, according to the configuration change process illustrated in FIG. 17, since the transfer inhibition flag is set in the SB 10 of which configuration change process is being executed, the error notification packet does not arrive at the SB 10 of which configuration change process is being executed by inhibiting the transfer of the error notification packet to the SB 10 of which configuration change process is being executed, so that this does not shift to the error inhibition mode and it is not necessary to execute the unnecessary process to release the error inhibition mode upon the restoration of the configuration of the SB 10 after the completion of the configuration change process.

Figure 18:
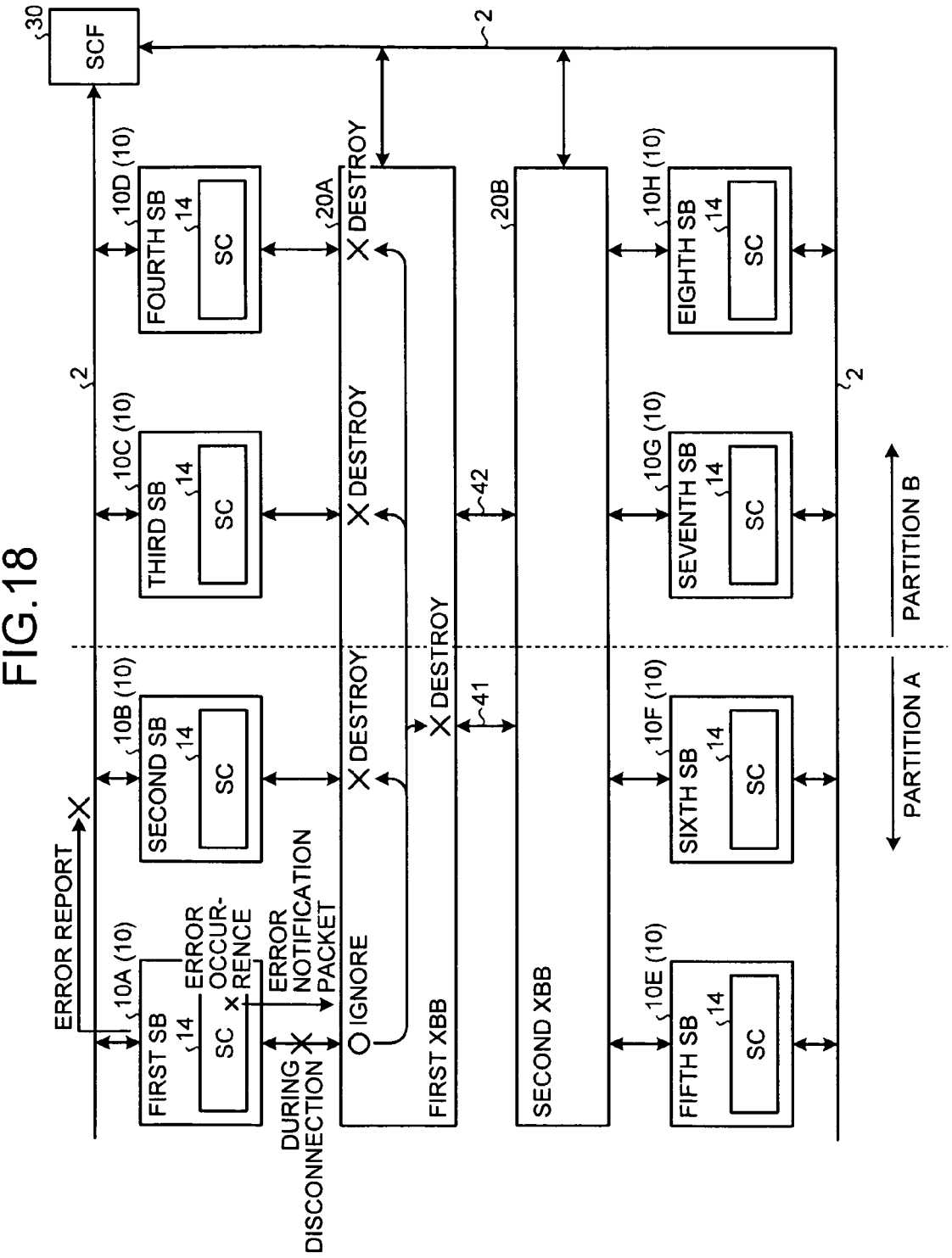
FIG. 18 is an illustrative diagram illustrating the operation of the information processing device related to a case in which the error of the level 2 occurs in the first SB during execution of the configuration change process of the first SB, for example, during the disconnection.

FIG. 18 is an illustrative diagram illustrating the operation of the information processing device 1 related to a case in which the error of the level 2 occurs in the first SB 10A during the execution of the configuration change process of the first SB 10A, for example, during the disconnection.

When the configuration change instruction related to the disconnection of the first SB 10A is detected through the configuration change detecting unit 94, the SCF controller 97 on the side of the SCF 30 illustrated in FIG. 18 sets to suspend the acceptance of the error report via the control line 2 through the error report acceptance suspending unit 97A.

When setting the suspension of the acceptance of the error report, the XBB controller 96 on the side of the SCF controller 97 sets the destroy flag in the input packet analyzing unit 51 in the first XBB 20A connected to the first SB 10A of which configuration change process is being executed.

Further, when the XBB controller 96 sets the destroy flag in the input packet analyzing unit 51 connected to the first SB 10A of which configuration change process is being executed, this sets the transfer inhibition flag to inhibit the transfer of the error notification packet to the first SB 10A in the external output BC packet analyzing unit 55 and the internal output BC packet analyzing unit 54 in the first XBB 20A connected to the first SB 10A.

Although the first SB 10A of which configuration change process is being executed notifies the SCF 30 of the error report via the control line 2 when detecting the occurrence of the error of the level 2, for example, since the acceptance suspension is set on the side of the SCF 30, the acceptance of the error report from the first SB 10A is suspended.

When the first SB 10A of which configuration change process is being executed detects the occurrence of the error of the level 2, this notifies the input packet analyzing unit 51 in the first XBB 20A connected to the first SB 10A of the error notification packet of the level 2.

However, since the destroy flag is set in the input packet analyzing unit 51 connected to the first SB 10A, the error notification packet of the level 2 received from the first SB 10A is destroyed. Meanwhile, the input packet analyzing unit 51 connected to the first SB 10A destroys the error notification packet of the level 2 from the first SB 10A and the error notification packet of the level 2 from the first SB 10A does not arrive at other SB 10 and XBB 20, so that the SB 10 and the XBB 20 do not shift to the error inhibition mode.

Thereafter, when the configuration change process for the first SB 10A is completed, the SCF releases the acceptance suspension setting, releases the destroy flag being set in the input packet analyzing unit 51 in the first XBB 20A connected to the first SB 10A and releases the transfer inhibition flag being set in the internal output BC packet analyzing unit 54 and the external output BC packet analyzing unit 55 in the first XBB 20A connected to the first SB 10A.

In the SCF 30, when the configuration change process for the first SB 10A is completed, even if the first SB 10A is the error occurrence site, the first SB 10A is disconnected from the system configuration, so that there is no problem if the error restoration process for the first SB 10A is not executed, and further, since the error notification packet from the first SB 10A does not arrive at other SB 10 and XBB 20, they do not shift to the error inhibition mode, so that processing load related to the setting and releasing of the unnecessary error inhibition mode may be reduced.

As a result, in the information processing device 1, as illustrated in FIG. 18, even if the error occurs in the first SB 10A of which configuration change process is being executed, the error notification packet of the level 2 from the first SB 10A is destroyed based on the destroy flag set in the input packet analyzing unit 51 on the side of the first XBB 20A connected to the first SB 10A, so that a case in which the first XBB 20A, the second XBB 20B, the second SB 10B, the fifth SB 10E and the sixth SB 10F in the same partition are notified of the error notification packet of the level 2 from the first SB 10 of which configuration change process is being executed and the error inhibition mode is set may be avoided.

According to the information processing device 1 illustrated in FIG. 18, when the error of the level 2 occurs in the first SB 10A of which configuration change process is being executed, the acceptance of the error report from the first SB 10A is suspended until the configuration change process is completed and the destroy flag to destroy the error notification packet of the level 2 from the first SB 10A is set in the input packet analyzing unit 51 on the side of the first XBB 20A connected to the first SB 10A until the configuration change process is completed, so that a case in which the unnecessary error inhibition mode is set by the transfer of the error notification packet accompanying with the detection of the occurrence of the error of the first SB 10A of which configuration change process is being executed is avoided, and as a result, the processing load to release the setting may be reduced.

Figure 19:
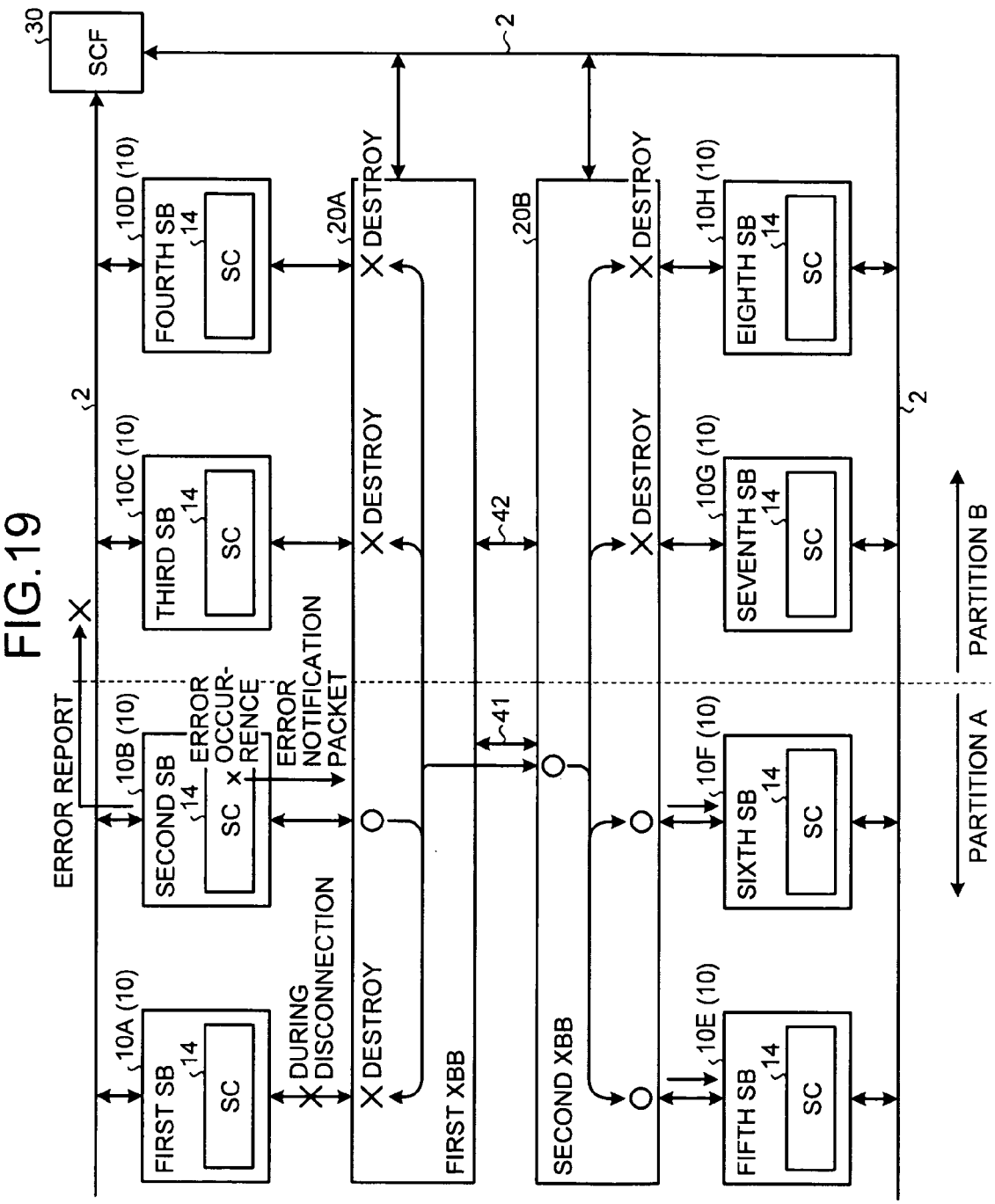
FIG. 19 is an illustrative diagram illustrating the operation of the information processing device related to a case in which the error of the level 2 occurs in a second SB in the same partition during the execution of the configuration change process of the first SB, for example, during the disconnection.

FIG. 19 is an illustrative diagram illustrating the operation of the information processing device 1 related to a case in which the error of the level 2 occurs in the second SB 10B in the same partition during the execution of the configuration change process of the first SB 10A, for example, during the disconnection.

When detecting the configuration change instruction related to the disconnection of the first SB 10A through the configuration change detecting unit 94, the SCF controller 97 on the side of the SCF 30 illustrated in FIG. 19 sets to suspend the acceptance of the error report via the control line 2 through the error report acceptance suspending unit 97A.

When the acceptance of the error report is set to be suspended, the XBB controller 96 on the side of the SCF controller 97 sets the destroy flag in the input packet analyzing unit 51 in the first XBB 20A connected to the first SB 10A of which configuration change process is being executed.

Further, when the XBB controller 96 sets the destroy flag in the input packet analyzing unit 51 connected to the first SB 10A of which configuration change process is being executed, this sets the transfer inhibition flag to inhibit the transfer of the error notification packet to the first SB 10A in the external output BC packet analyzing unit 55 and the internal output BC packet analyzing unit 54 in the first XBB 20A connected to the first SB 10A.

When detecting the occurrence of the error of the level 2, for example, during the execution of the configuration change process for the first SB 10A in the same partition, the second SB 10B notifies the SCF 30 of the error report via the control line 2. On the side of the SCF 30, the acceptance suspension is set, so that the acceptance of the error report from the second SB 10B is suspended.

When detecting the occurrence of the error of the level 2 during the execution of the configuration change process for the first SB 10A, the second SB 10B notifies the input packet analyzing unit 51 in the first XBB 20A connected to the second SB 10B of the error notification packet of the level 2.

When receiving the error notification packet of the level 2 from the second SB 10B, the input packet analyzing unit 51 connected to the second SB 10B sets the received error notification packet of the level 2 in the input queue for BC 52.

The input queue for BC 52 transfers the set error notification packet of the level 2 to each internal output BC packet analyzing unit 54 of the first SB 10A, the third SB 10C and the fourth SB 10D via the BC selector 61 and the FIFO 63 and transfer the set error notification packet of the level 2 to the second XBB 20B via the BC selector 61 and the BC bus 41.

When receiving the error notification packet of the level 2 from the second SB 10B, the internal output BC packet analyzing unit 54 connected to the third SB 10C and the fourth SB 10D judges whether this is of the same partition as the second SB 10B, and since this is not of the same partition, this destroys the error notification packet of the level 2 from the second SB 10B.

When the internal output BC packet analyzing unit 54 connected to the first SB 10A receives the error notification packet of the level 2 from the second SB 10B, since this is of the same partition as the second SB 10B, this normally sets the error notification packet of the level 2 in the output queue for BC 58 and transfers the same to the first SB 10A via the output selector 60.

However, since the transfer inhibition flag is being set, the internal output BC packet analyzing unit 54 connected to the first SB 10A destroys the error notification packet of the level 2 from the second SB 10B. As a result, the error notification packet from the second SB 10B does not arrive at the first SB 10A, so that this does not shift to the error inhibition mode.

When receiving the error notification packet of the level 2 from the second SB 10B via the first XBB 20A through the BC bus 41, the second XBB 20B notifies the external output BC packet analyzing unit 55 connected to the fifth SB 10E, the sixth SB 10F, the seventh SB 10G and the eighth SB 10H of the received error notification packet of the level 2.

When receiving the error notification packet of the level 2 from the second SB 10B, the external output BC packet analyzing unit 55 connected to the seventh SB 10G and the eighth SB 10H judges whether this is of the same partition as the second SB 10B, and since this is not of the same partition, this destroys the error notification packet of the level 2 from the second SB 10B.

When the external output BC packet analyzing unit 55 connected to the fifth SB 10E and the sixth SB 10F receives the error notification packet of the level 2 from the second SB 10B, since this is of the same partition as the second SB 10B, this transfers the error notification packet of the level 2 from the second SB 10B to the fifth SB 10E and the sixth SB 10F via the output queue for BC 58 and the output selector 60. As a result, the fifth SB 10E and the sixth SB 10F shift to the error inhibition mode according to the error notification packet from the second SB 10B.

When the error of the level 2 occurs in the second SB 10B during the execution of the configuration change process of the first SB 10A, the first XBB 20A inhibits the transfer of the error notification packet to the first SB 10 of which configuration change process is being executed in the same partition as the second SB 10B.

The first XBB 20A and the second XBB 20B shift to the error inhibition mode according to the error notification packet form the second SB 10B by transferring the error notification packet of the level 2 to the fifth SB 10E and the sixth SB 10F in the same partition as the second SB 10B.

Thereafter, when the configuration change process for the first SB 10A is completed, the SCF 30 releases the acceptance suspension setting, releases the destroy flag being set in the input packet analyzing unit 51 in the first XBB 20A connected to the first SB 10A and releases the transfer inhibition flag being set in the internal output BC packet analyzing unit 54 and the external output BC packet analyzing unit 55 in the first XBB 20A connected to the first SB 10A.

When the configuration change process for the first SB 10A is completed, the SCF 30 executes the error restoration process for the error occurrence site of the second SB 10B through the restoration process executing unit 92, and after executing the error restoration process, this releases the setting of the error inhibition mode for the first XBB 20A, the second XBB 20B, the fifth SB 10E and the sixth SB 10F through the mode releasing unit 93.

As a result, in the information processing device 1, as illustrated in FIG. 19, even if the error occurs in the second SB 10B during the execution of the configuration change process of the first SB 10A, the transfer of the error notification packet of the level 2 from the second SB 10B to the first SB 10A is inhibited based on the transfer inhibition flag set in the internal output BC packet analyzing unit 54 and the external output BC packet analyzing unit 55 on the side of the first XBB 20A connected to the first SB 10A, so that a case in which the first SB 10A of which configuration change process is being executed is set in the error inhibition mode according to the transfer of the error notification packet of the level 2 from the second SB 10B may be avoided.

According to the information processing device 1 illustrated in FIG. 19, when the error of the level 2 occurs in the second SB 10B in the same partition as the first SB 10A during the execution of the configuration change process for the first SB 10A, the acceptance of the error report from the second SB 10B is suspended until the configuration change process is completed and the transfer inhibition flag to inhibit the transfer of the error notification packet of the level 2 to the first SB 10A is set in the internal output BC packet analyzing unit 54 and the external output BC packet analyzing unit 55 on the side of the first XBB 20A connected to the first SB 10A until the configuration change process is completed, so that a case in which the first SB 10 of which configuration change process is being executed is set to the error inhibition mode according to the transfer of the error notification packet is avoided, and as a result, the processing load related to the releasing of the error inhibition mode upon the restoration of the configuration of the first SB 10A may be reduced.

FIG. 20 is an illustrative diagram illustrating the operation of the information processing device 1 related to a case in which the error of the level 3 occurs in the first SB 10A in the different partition during the execution of the configuration change process of the third SB 10C, for example, during the disconnection.

When detecting the configuration change instruction related to the disconnection of the third SB 10C through the configuration change detecting unit 94, the SCF controller 97 on the side of the SCF 30 illustrated in FIG. 20 sets to suspend the acceptance of the error report via the control line 2 through the error report acceptance suspending unit 97A.

When the acceptance of the error report is set to be suspended, the XBB controller 96 on the side of the SCF controller 97 sets the destroy flag in the input packet analyzing unit 51 in the first XBB 20A connected to the third SB 10C of which configuration change process is being executed.

Further, when the XBB controller 96 sets the destroy flag in the input packet analyzing unit 51 connected to the third SB 10C of which configuration change process is being executed, this sets the transfer inhibition flag to inhibit the transfer of the error notification packet to the third SB 10C in the external output BC packet analyzing unit 55 and the internal output BC packet analyzing unit 54 in the first XBB 20A connected to the third SB 10C.

When detecting the occurrence of the error of the level 3, for example, during the execution of the configuration change process for the third SB 10C in the different partition, the first SB 10A notifies the SCF 30 of the error report via the control line 2. On the side of the SCF 30, since the acceptance suspension is set, the acceptance of the error report from the first SB 10A is suspended.

When detecting the occurrence of the error of the level 3 during the execution of the configuration change process for the third SB 10C, the first SB 10A notifies the input packet analyzing unit 51 in the first XBB 20A connected to the first SB 10A of the error notification packet of the level 3.

When receiving the error notification packet of the level 3 from the first SB 10A, the input packet analyzing unit 51 connected to the first SB 10A sets the received error notification packet of the level 3 in the input queue for BC 52.

The input queue for BC 52 transfers the set error notification packet of the level 3 to each internal output BC packet analyzing unit 54 in the second SB 10B, the third SB 10C and the fourth SB 10D via the BC selector 61 and the FIFO 63 and transfers the set error notification packet of the level 3 to the second XBB 20B via the BC selector 61 and the BC bus 41.

When the internal output BC packet analyzing unit 54 connected to the third SB 10C receives the error notification packet of the level 3 from the first SB 10A, since the transfer inhibition flag is being set, this destroys the error notification packet of the level 3 from the first SB 10A.

When the internal output BC packet analyzing unit 54 of the second SB 10B and the fourth SB 10D receives the error notification packet of the level 3 from the first SB 10A, this sets the error notification packet of the level 3 from the first SB 10A in the output queue for BC 58 to transfer to the second SB 10B and the fourth SB 10D via the output selector 60 regardless of whether this is of the same partition as the first SB 10A. As a result, the second SB 10B and the fourth SB 10D shift to the error inhibition mode according to the arrival of the error notification packet from the first SB 10A.

When receiving the error notification packet of the level 3 from the first SB 10A from the first XBB 20A via the BC bus 41, the second XBB 20B notifies the external output BC packet analyzing unit 55 connected to the fifth SB 10E, the sixth SB 10F, the seventh SB 10G and the eighth SB 10H of the received error notification packet of the level 3.

When the external output BC packet analyzing unit 55 connected to the fifth SB 10E, the sixth SB 10F, the seventh SB 10G and the eighth SB 10H receives the error notification packet of the level 3 from the first SB 10A, this transfers the error notification packet of the level 3 from the first SB 10A to the fifth SB 10E, the sixth SB 10F, the seventh SB 10G and the eighth SB 10H via the output queue for BC 58 and the output selector 60 regardless of whether this is in the same partition as the first SB 10A. As a result, the fifth SB 10E, the sixth SB 10F, the seventh SB 10G and the eighth SB 10H shift to the error inhibition mode according to the arrival of the error notification packet from the first SB 10A.

When the error of the level 3 occurs in the first SB 10A during the execution of the configuration change process of the third SB 10C, the first XBB 20A inhibits the transfer of the error notification packet of the level 3 from the first SB 10A to the third SB 10C of which configuration change process is being executed in the partition different from that of the first SB 10A.

Further, it is configured such that the first XBB 20A and the second XBB 20B transfer the error notification packet of the level 3 to the second SB 10B, the fifth SB 10E and the sixth SB 10F in the same partition as the first SB 10A and the fourth SB 10D, the seventh SB 10G and the eighth SB 10H in the different partition. As a result, the first XBB 20A and the second XBB 20B shift to the error inhibition mode according to the error notification packet from the first SB 10A.

Thereafter, when the configuration change process for the third SB 10C is completed, the SCF 30 releases the acceptance suspension setting, releases the destroy flag being set on the input packet analyzing unit 51 in the first XBB 20A connected to the third SB 10C and releases the transfer inhibition flag being set in the internal output BC packet analyzing unit 54 and the external output BC packet analyzing unit 55 in the first XBB 20A connected to the third SB 10C.

When the configuration change process for the third SB 10C is completed, the SCF 30 executes the error restoration process for the error occurrence site of the first SB 10A and the entire system through the restoration process executing unit 92, and after executing the error restoration process, this releases the setting of the error inhibition mode in the first XBB 20A, the second XBB 20B, the second SB 10B, the fourth SB 10D, the fifth SB 10E, the sixth SB 10F, the seventh SB 10G and the eighth SB 10H through the mode releasing unit 93.

As a result, in the information processing device 1, as illustrated in FIG. 20, it is configured such that even if the error of the level 3 occurs in the first SB 10A in the different partition during the execution of the configuration change process for the third SB 10C, the transfer of the error notification packet of the level 3 from the first SB 10A to the third SB 10C is inhibited based on the transfer inhibition flag being set in the internal output BC packet analyzing unit 54 and the external output BC packet analyzing unit 55 on the side of the first XBB 20A connected to the third SB 10C, so that a case in which the third SB 10C of which configuration change process is being executed is set in the error inhibition mode according to the transfer of the error notification packet of the level 3 from the first SB 10A may be avoided.

In the information processing device 1 illustrated in FIG. 20, when the error of the level 3 occurs in the first SB 10A in the different partition during the execution of the configuration change process for the third SB 10C, the acceptance of the error report from the first SB 10A is suspended until the configuration change process is completed and the transfer inhibition flag to inhibit the transfer of the error notification packet of the level 3 to the third SB 10C is set in the internal output BC packet analyzing unit 54 and the external output BC packet analyzing unit 55 on the side of the first XBB 20A connected to the third SB 10C until the configuration change process is completed. As a result, a case in which the third SB 10C of which configuration change process is being executed shifts to the error inhibition mode according to the transfer of the error notification packet may be avoided, and further, the processing load related to the releasing of the error inhibition mode upon the restoration of the configuration of the third SB 10C may be reduced.

In this embodiment, it is configured such that the acceptance of the error report is suspended during the execution of the configuration change process related to the SB 10 and the destroy flag is set in the input packet analyzing unit 51 on the side of the XBB 20 connected to the SB 10 of which configuration change process is being executed in order to destroy to the error notification data received from the SB 10 of which configuration change process is being executed until the execution of the configuration change process is completed. Therefore, according to this embodiment, even if the error occurs in the SB 10 of which configuration change process is being executed, since the error notification packet does not arrive at the SB 10 other than the SB 10 of which configuration change process is being executed and the XBB 20 by destroying the error notification packet from the SB 10 of which configuration change process is being executed, so that they do not shift to the error inhibition mode. As a result, a case in which the error inhibition mode remains unreleased and the occurrence of the error cannot be detected may be avoided, so that stable error detection control may be secured.

In this embodiment, it is configured such that the acceptance of the error report is suspended during the execution of the configuration change process related to the SB 10 and the transfer inhibition flag is set in the internal output BC packet analyzing unit 54 and the external output BC packet analyzing unit 55 on the side of the XBB 20 connected to the SB 10 of which configuration change process is being executed in order to inhibit the transfer of the error notification data to the SB 10 of which configuration change process is being executed until the execution of the configuration change process is completed. Therefore, according to this embodiment, the error notification packet does not arrive at the SB 10 of which configuration change process is being executed by inhibiting the transfer of the error notification packet to the SB 10 of which configuration change process is being executed, so that the SB 10 of which configuration change process is being executed does not shift to the error inhibition mode and it is not required to execute the unnecessary process such as to release the error inhibition mode upon the restoration of the configuration, therefore the stable error detection control may be secured.

Meanwhile, in the above-described embodiment, it is configured such that the plurality of SBs 10 and the plurality of XBBs 20 are divided in a partition unit, and when the error occurs in the second SB 10B in the same partition during the execution of the configuration change process of the first SB 10A as illustrated in FIG. 19, for example, the error notification packet from the second SB 10B to the first SB 10A of which configuration change process is being executed is destroyed on the side of the first XBB 20A and the fifth SB 10E and the sixth SB 10F in the same partition as the second SB 10B are notified of the error notification packet from the second SB 10B via the first XBB 20A and the second XBB 20B.

However, when there is no partition division, all the SBs other than the first SB 10A of which configuration change process is being executed and the second SB 10B being the error reporting circuit, that is to say, the third SB 10C, the fourth SB 10D, the fifth SB 10E, the sixth SB 10F, the seventh SB 10G and the eighth SB 10H are notified of the error notification packet from the second SB 10B via the first XBB 20A and the second XBB 20B. In this case, the first XBB 20A and the second XBB 20B in addition to the third SB 10C, the fourth SB 10D, the fifth SB 10E, the sixth SB 10F, the seventh SB 10G and the eighth SB 10H shift to the error inhibition mode.

Then, it goes without saying that, after the completion of the execution of the configuration change process of the first SB 10A, the SCF 30 starts accepting the error report of which acceptance is suspended from the second SB 10B via the control line 2, and after executing the error restoration process for the error occurrence site based on the error report, this releases the error inhibition mode being set in the first XBB 20A, the second XBB 20B, the third SB 10C, the fourth SB 10D, the fifth SB 10E, the sixth SB 10F, the seventh SB 10G and the eighth SB 10H.

Although the configuration change to disconnect the SB 10 from the XBB 20, for example, is described as an example in the above-described embodiment, it goes without saying that this may be applied to the configuration change when changing the number of the CPU 11, the memory 13 and the like in the SB 10 and the similar effect may be obtained.

Although the reset process is executed for the entire partition including the SB 10 of the error occurrence site even if the ERLV is the level 1 when executing the reset process for the restoration at the step S54 of the error restoration process illustrated in FIG. 16 in the above-described embodiment, it goes without saying that the partial reset process for the entire SB 10 of the error occurrence site or the error occurrence site in the SB 10 may be executed.

Although the SCF 30 sets the destroy flag to destroy the error notification packet from the SB 10 of which configuration change process is being executed and the transfer inhibition flag to inhibit the transfer of the error notification packet to the SB 10 of which configuration change process is being executed in the XBB 20 in the above-described embodiment, it is also possible to set the destroy flag and the transfer inhibition flag in the SB 10 of which configuration change process is being executed, for example.

In this case, it is configured such that the SB 10 in which the destroy flag and the transfer inhibition flag are set destroys the error notification packet accompanying with the error occurrence and does not shift to the error inhibition mode by destroying the received error notification packet even if receiving the error notification packet from other error reporting circuit, so that it goes without saying that the similar effect may be obtained.

Although this embodiment is described as above, it goes without saying that the scope of the technical idea of the information processing device, the transfer circuit and the error controlling method of the information processing device is not limited by this embodiment, and various embodiments are possible without departing from the scope of the technical idea recited in Claims. Also, the effect described in this embodiment is not limited thereto.

Also, it goes without saying that an entire or a part of the process described to be automatically performed out of the various processes described in this embodiment may be manually performed, and on the other hand, an entire of a part of the process described to be manually performed may be automatically performed. Also, it goes without saying that handling procedure, control procedure, specific name, information including various pieces of data and parameters described in this embodiment may be appropriately changed except when being specifically described.

Also, each component of each device illustrated is illustrated functionally and schematically, and it goes without saying that they are not necessarily physically configured as illustrated and the specific aspect of each device is not at all limited to the illustrated one.

Further, it goes without saying that an entire or an optional part of various process functions performed by each device may be executed on the central processing unit (CPU) (or a micro computer such as a micro processing unit (MPU) and a micro controller unit (MCU)) or a program analyzed to be executed on the CPU (or the micro computer such as the MPU and MCU) or hardware by wired logic.

According to the disclosed device, even if the error occurs during the execution of the configuration change process, the error detection control is executed with the system configuration except the control circuit related to the configuration change process after the completion of the configuration change process, thereby securing the stable error detection control under the same system configuration.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device, comprising:
a plurality of control circuits;
a transfer circuit that executes data transfer between the plurality of control circuits; and
a management control circuit that controls the plurality of control circuits and the transfer circuit, wherein
the control circuits and the transfer circuit include
an error reporting unit that notifies the management control circuit of an error report when detecting occurrence of an error; and
an error transmitting unit that transmits error notification data when detecting the occurrence of the error, the transfer circuit includes
- a transfer controller that transfers received error notification data to a circuit other than a circuit that has transmitted the error notification data out of the control circuits and the transfer circuit when receiving the error notification data, and the management control circuit includes
- a restoration process executing unit that executes a restoration process for the error occurrence site based on the error report when receiving the error report;
- a configuration change process executing unit that executes a configuration change process corresponding to a configuration change instruction when detecting the configuration change instruction related to the control circuits;
- a report acceptance suspending unit that suspends acceptance of the error report during execution of the configuration change process of the information processing device by the configuration change process executing unit; and
- a transfer circuit controller that controls the transfer circuit to abandon the error notification data received from a control circuit of which configuration change process is being executed by the configuration change process executing unit and controls the transfer circuit to inhibit transfer of the error notification data to the control circuit of which configuration change process is being executed.

2. The information processing device according to claim 1, wherein
the configuration change process executing unit executes the configuration change process when detecting the configuration change instruction related to an optional circuit out of the plurality of control circuits, and
the transfer circuit controller controls the transfer circuit to abandon the error notification data from the optional circuit of which configuration change process is being executed.

3. The information processing device according to claim 1, wherein
the configuration change process executing unit executes the configuration change process when detecting the configuration change instruction related to an optional circuit out of the plurality of control circuits;
the transfer circuit controller controls the transfer circuit to inhibit the transfer of the error notification data received from a circuit other than the optional circuit out of the control circuits and the transfer circuit to the optional circuit of which configuration change process is being executed, and
the restoration process executing unit starts accepting the error report of which acceptance is being suspended by the report acceptance suspending unit when the execution of the configuration change process related to the optional circuit is completed by the configuration change executing unit.

4. The information processing device according to claim 1, wherein
the management control circuit divides the plurality of control circuits and the transfer circuit in a unit of a plurality of partitions and controls the control circuits and the transfer circuit belonging to each partition, and
the transfer controller on a side of the transfer circuit transfers the error notification data to a circuit other than the circuit that has transmitted the error notification data out of the control circuits and the transfer circuit belonging to the same partition as the circuit that has transmitted the error notification data when receiving the error notification data.

5. The information processing device according to claim 4, wherein
the configuration change process executing unit executes the configuration change process when detecting the configuration change instruction related to an optional circuit out of the plurality of control circuits, and
the transfer circuit controller controls the transfer circuit to abandon the error notification data from the optional circuit of which configuration change process is being executed by the configuration change process executing unit.

6. The information processing device according to claim 4, wherein
the configuration change process executing unit executes the configuration change process when detecting the configuration change process related to an optional circuit out of the plurality of control circuits,
the transfer circuit controller controls the transfer circuit to inhibit the transfer of the error notification data received from a circuit other than the optional circuit out of the control circuits and the transfer circuit belonging to the same partition as the optional circuit to the optional circuit of which configuration change process is being executed by the configuration change process executing unit, and
the restoration process executing unit starts accepting the error report of which acceptance is being suspended by the report acceptance suspending unit when the execution of the configuration change process related to the optional circuit is completed by the configuration change process executing unit.

7. The information processing device according to claim 1, wherein
the control circuits and the transfer circuit include a mode setting unit that sets an error inhibition mode to inhibit error detection of the error occurrence site when receiving the error notification data, and
the management control circuit includes a mode releasing unit that releases the error inhibiting mode being set when the restoration process of the error occurrence site is completed by the restoration process executing unit.

8. A transfer circuit, managed and controlled by a management control circuit that controls a plurality of control circuits, the transfer circuit for executing data transfer between the plurality of control circuits, comprising:
a transfer controller that transfers received error notification data to a circuit other than a circuit that has transmitted the error notification data, when receiving the error notification data indicating occurrence of an error, wherein
the transfer controller abandons the error notification data received from the control circuit of which configuration change process is being executed by the management control circuit and inhibits transfer of the error notification data from a circuit other than the control circuit of which configuration change process of the information processing device is being executed to the control circuit of which configuration change process is being executed.

9. The transfer circuit according to claim 8, wherein
the management control circuit divides the plurality of control circuits in a unit of a plurality of partitions and controls the control circuits belonging to each partition, and the transfer controller transfers the error notification data to a circuit other than the circuit that has transmitted the error notification data out of the circuits belonging to the same partition as the circuit that has transmitted the error notification data when receiving the error notification data.

10. An error controlling method for an information processing device including a plurality of control circuits, a transfer circuit that executes data transfer between the plurality of control circuits and a management control circuit that controls the plurality of control circuits and the transfer circuit, the error controlling method comprising:
   notifying the management control circuit of an error report at the control circuits and the transfer circuit when detecting occurrence of an error;
   transmitting error notification data at the control circuits and the transfer circuit when detecting the occurrence of the error;
   transferring received error notification data to a circuit other than a circuit that has transmitted the error notification data out of the control circuits and the transfer circuit at the transfer circuit when receiving the error notification data;
   executing a restoration process for the error occurrence site based on the error report at the management control circuit when accepting the error report;
   executing a configuration change process corresponding to a configuration change instruction for the information processing device at the management control circuit when detecting the configuration change instruction related to the control circuits;
   suspending acceptance of the error report at the management control circuit during execution of the configuration change process; and
   controlling the transfer circuit to abandon the error notification data received from the control circuit of which configuration change process is being executed and controlling the transfer circuit to inhibit transfer of the error notification data to the control circuit of which configuration change process is being executed at the management control circuit.

11. The error controlling method according to claim 10, wherein
   the executing the configuration change process includes executing the configuration change process when detecting the configuration change instruction related to an optional circuit out of the plurality of control circuits, and
   the controlling the transfer circuit includes controlling the transfer circuit to abandon the error notification data from the optional circuit of which configuration change process is being executed.

12. The error controlling method according to claim 10, wherein
   the executing the configuration change process includes executing the configuration change process when detecting the configuration change instruction related to an optional circuit out of the plurality of control circuits,
   the controlling the transfer circuit includes controlling the transfer circuit to inhibit the transfer of the error notification data received from a circuit other than the optional circuit out of the control circuits and the transfer circuit to the optional circuit of which configuration change process is being executed, and
   the executing the restoration process includes starting accepting the error report of which acceptance is being suspended at the suspending when the execution of the configuration change process related to the optional circuit is completed.

13. The error controlling method of the information processing device according to claim 10, wherein
   the management control circuit divides the plurality of control circuits and the transfer circuit in a unit of a plurality of partitions and controls the control circuits and the transfer circuit belonging to each partition, and
   the transferring the received error notification data includes transferring the error notification data to a circuit other than the circuit that has transmitted the error notification data out of the control circuits and the transfer circuit belonging to the same partition as the circuit that has transmitted the error notification data when receiving the error notification data.

14. The error controlling method according to claim 13, wherein
   the executing the configuration change process includes executing the configuration change process when detecting a configuration change instruction related to an optional circuit out of the plurality of control circuits, and
   the controlling the transfer circuit includes controlling the transfer circuit to abandon the error notification data from the optional circuit of which configuration change process is being executed.

15. The error controlling method according to claim 13, wherein
   the executing the configuration change process includes executing the configuration change process when detecting a configuration change instruction related to an optional circuit out of the plurality of the control circuits,
   the controlling the transfer circuit includes controlling the transfer circuit to inhibit the transfer of the error notification data received from a circuit other than the optional circuit out of the control circuits and the transfer circuit belonging to the same partition as the optional circuit to the optional circuit of which configuration change process is being executed, and
   the executing the restoration process includes starting accepting the error report of which acceptance is being suspended at the suspending when the execution of the configuration change process related to the optional circuit is completed.

16. The error controlling method according to claim 10, comprising:
   setting an error inhibition mode to inhibit error detection of the error occurrence site at the control circuits and the transfer circuit when receiving the error notification data; and
   releasing the error inhibition mode being set at the management control circuit when the restoration process of the error occurrence site is completed.

* * * * *